(12) United States Patent
Piveteau et al.

(10) Patent No.: US 12,443,868 B2
(45) Date of Patent: Oct. 14, 2025

(54) QUANTUM ERROR MITIGATION USING HARDWARE-FRIENDLY PROBABILISTIC ERROR CORRECTION

(71) Applicant: International Business Machines Corporation, Armonk, NY (US)

(72) Inventors: Christophe Piveteau, Zürich (CH); David Sutter, Zürich (CH); Stefan Woerner, Aarau (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1093 days.

(21) Appl. No.: 17/029,290

(22) Filed: Sep. 23, 2020

(65) Prior Publication Data

US 2022/0092460 A1 Mar. 24, 2022

(51) Int. Cl.
*G06N 10/00* (2022.01)
*G06F 17/18* (2006.01)
*G06F 18/10* (2023.01)
*G06N 10/70* (2022.01)
*H03K 19/20* (2006.01)

(52) U.S. Cl.
CPC ............ *G06N 10/00* (2019.01); *G06F 17/18* (2013.01); *G06F 18/10* (2023.01); *G06N 10/70* (2022.01); *H03K 19/20* (2013.01)

(58) Field of Classification Search
CPC ...................................................... G06N 10/00
See application file for complete search history.

(56) References Cited

U.S. PATENT DOCUMENTS

| 7,006,267 B2 | 2/2006 | Franson et al. |
| 7,849,387 B2 | 12/2010 | Biswas et al. |
| 9,892,364 B2 | 2/2018 | Tang et al. |
| 10,664,761 B2 | 5/2020 | Haener et al. |

(Continued)

FOREIGN PATENT DOCUMENTS

CH 111510158 8/2020

OTHER PUBLICATIONS

Endo, S., Benjamin, S., & Li, Y. (2018). Practical Quantum Error Mitigation for Near-Future Applications. Physical Review X, 8(3). (Year: 2018).*

(Continued)

*Primary Examiner* — Kakali Chaki
*Assistant Examiner* — Johnathan R Germick
(74) *Attorney, Agent, or Firm* — Amin, Turocy & Watson, LLP

(57) ABSTRACT

Techniques facilitating error mitigation for quantum computing devices. In one example, a system can comprise a process that executes computer executable components stored in memory. The computer executable components comprise: an approximation component; a budget component; and an optimization component. The approximation component can generate an approximate decomposition of a quantum gate. The budget component can set a budget value ($C_{budget}$) for a C-factor that is a metric for increase in variance of quasi-probability sampling. The optimization component can determine an optimal decomposition for the quantum gate as a function of $C_{budget}$.

6 Claims, 10 Drawing Sheets

(56) References Cited

U.S. PATENT DOCUMENTS

| | | |
|---|---|---|
| 10,748,082 B2 | 8/2020 | Rigetti et al. |
| 2019/0042969 A1 | 2/2019 | Hogaboam et al. |
| 2020/0175409 A1 | 6/2020 | Kandala et al. |

OTHER PUBLICATIONS

Ng, H., & Mandayam, P. (2010). Simple approach to approximate quantum error correction based on the transpose channel. Physical Review A, 81(6). (Year: 2010).*

Chao Song et al. Quantum computation with universal error mitigation on a superconducting quantum processor.Sci. Adv.5, eaaw5686(2019). DOI:10.1126/sciadv.aaw5686 (Year: 2019).*

Robert Peharz, & Franz Pernkopf (2012). Sparse nonnegative matrix factorization with $\ell$ 0-constraints. Neurocomputing, 80, 38-46. (Year: 2012).*

Temme et al., "Error Mitigation for Short-Depth Quantum Circuits," Phys. Rev. Lett. 119, 180509—Published Nov. 3, 2017, 5 pages.

Endo et al., "Practical Quantum Error Mitigation for Near-Future Applications," arXiv:1712.09271v2 [quant-ph] May 27, 2018, 20 pages.

Burer et al., "A Nonlinear Programming Algorithm for Solving Semidefinite Programs via Low-rank Factorization," Mathematical Programming, 95(2):329-357, 2003, 30 pages.

Greenbaum, "Introduction to quantum gate set tomography," arXiv:1509.02921v1 [quant-ph], 2015, 56 pages.

Strikis et al., "Learning-based quantum error mitigation," arXiv:2005.07601v1 [quant-ph], May 15, 2020, 19 pages.

Harper et al., "Efficient learning of quantum noise," Nature Physics, Aug. 2020, 7 pages.

Abraham et al., "Qiskit: An open-source framework for quantum computing," https://zenodo.org/record/2562111#.X1kUZHIKj-g, Jan. 2019, 4 pages.

Diamond et al., "CVXPY: A Python-Embedded Modeling Language for Convex Optimization," Journal of Machine Learning Research, vol. 17, No. 83, Apr. 2016, 5 pages.

Agrawal et al., "A rewriting system for convex optimization problems," Journal of Control and Decision, vol. 5, No. 1, 2018, 19 pages.

M. ApS, MOSEK Optimizer API for Python 9.2.8, 2020, 455 pages.

Watrous, "Simpler semidefinite programs for completely bounded norms," Chicago Journal of Theoretical Computer Science, vol. 2013, Jul. 13, 2013, 19 pages.

Jones et al., "SciPy: Open Source Scientific Tools for Python," https://www.scipy.org/, 2001-, 3 pages.

Wood et al., "Tensor networks and graphical calculus for open quantum systems," arXiv:1111.6950v3 [quant-ph], May 7, 2015, 40 pages.

Maclaurin et al., "Autograd: Effortless Gradients in Numpy," ICML 2015 AutoML Workshop, 2015, 3 pages.

Burer et al., "Local minima and convergence in low-rank semidefinite programming," Mathematical Programming, vol. 103, pp. 427-444, Jul. 2005.

Cifuentes, "On the Burer-Monteiro method for general semidefinite programs," arXiv:1904.07147v2 [math.OC], Feb. 29, 2020, 10 pages.

Boumal, et al., "The non-convex Burer-Monteiro approach works on smooth semidefinite programs," arXiv:1606.04970v3 [math.OC], Apr. 10, 2018, 19 pages.

Pataki, "On the rank of extreme matrices in semidefinite programs and the multiplicity of optimal eigenvalues," Mathematics of Operations Research, vol. 23, No. 2, May 1998, 20 pages.

Barvinok, "Problems of distance geometry and convex properties of quadratic maps," Discrete and Computational Geometry, vol. 13, 1995, 14 pages.

\* cited by examiner

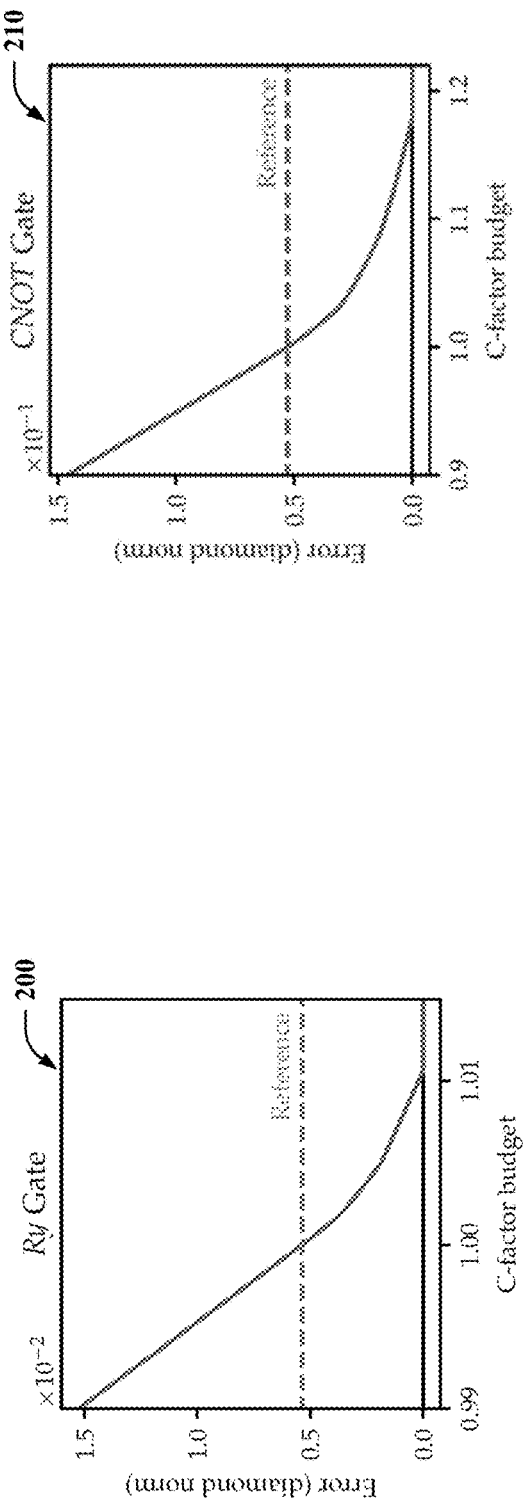
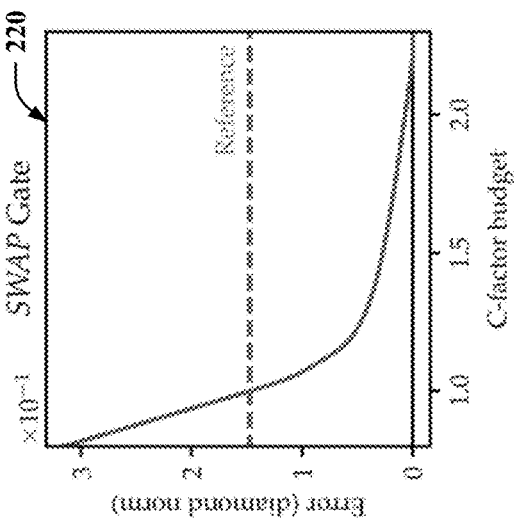
FIG. 2A
FIG. 2B
FIG. 2C

QUANTUM ERROR MITIGATION USING HARDWARE-FRIENDLY PROBABILISTIC ERROR CORRECTION

BACKGROUND

The subject disclosure relates to quantum computing, and more specifically, to techniques of facilitating error mitigation for quantum computing devices.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate error mitigation for quantum computing devices are described.

According to an embodiment, a system can comprise a process that executes computer executable components stored in memory. The computer executable components comprise: an approximation component; a budget component; and an optimization component. The approximation component can generate an approximate decomposition of a quantum gate. The budget component can set, based on the approximate decomposition, a budget value ($C_{budget}$) for a C-factor that is a metric for increase in variance of quasi-probability sampling. The optimization component can determine an optimal decomposition for the quantum gate as a function of $C_{budget}$.

In an embodiment, the approximation component can generate the approximate decomposition utilizing the following equation: $[U] \approx \Sigma_{i=1}^{M} \alpha_i \varepsilon_i$. In an embodiment, U denotes a unitary corresponding to the quantum gate; M denotes decomposition size; $\alpha_i$ denotes quasi-probability coefficients; and $\varepsilon_i$ denotes quantum channels that are implementable on hardware. In an embodiment, the C-factor=$C(\alpha_1, \ldots, \alpha_M):=\Sigma_{i=1}^{M}|\alpha_i|$.

In an embodiment, the optimization component can minimize $\epsilon(\alpha_1, \ldots, \alpha_M)$ such that $C(\alpha_1, \ldots, \alpha_M) \leq C_{budget}$ where $\epsilon$ denotes error. In an embodiment, the optimization component determines the optimal decomposition utilizing the following equation: minimize$\|[U]-\Sigma_{i=1}^{M} d_i F_i\|$ over $\{d_i\}$, where: $d_i$ denotes quasi-probability coefficients; and $F_i$ denotes quantum channels implementable on quantum hardware. In an embodiment, the optimization component generates the optimal decomposition for a trace-preserving (TP) linear map $G(\rho)$ by finding quantum channels $\{\varepsilon_1, \varepsilon_2, \varepsilon_3, \ldots, \varepsilon_M\}$ and corresponding coefficients $\{\alpha_1, \alpha_2, \alpha_3, \ldots, \alpha_M\}$ such that: $G(\rho)=\Sigma_{i=1}^{M}\alpha_i\varepsilon_i$ and $\Sigma_{i=1}^{M}|\alpha_i|$ is minimal. In an embodiment, the optimization component sets a rank constraint to $\leq r$, for a positive integer r, where the rank constraint corresponds to dimensionality of ancilla Hilbert space and $\varepsilon_i$ comprises ceiling($\log_2(\tau)$) ancilla qubits.

In an embodiment, the optimization component determines the optimal decomposition utilizing an iterative algorithm that includes decomposing an error that is indicative of a total approximation error between a set of desired quantum channels and a set of approximation quantum channels. In an embodiment, the set of approximation quantum channels can be generated using a Stinespring dilation. In an embodiment, variational unitary approximation is used to implement the Stinespring dilation. In an embodiment, the optimization component determines an optimal variational unitary approximation utilizing the following equation: minimize$\|V_{St}-V(U_{Var}(\theta))\|_2$. In an embodiment, $\theta$ denotes a tuple of a variational parameters; $V_{St}$ denotes a Stinespring isometry; $U_{Var}(\theta)$ denotes a unitary operation associated with the quantum gate as represented by a variational form; and $V(U_{Var}(\theta))$ denotes a submatrix of $U_{Var}(\theta)$ restricted on a subspace where ancilla qubits are fixed to a zero state.

In an embodiment, the system further comprises a distribution component that distributes the C-factor across N number of gates, wherein N is an integer>1. In an embodiment, the distribution component distributes the C-factor across the N gates to reduce a total sum of errors ($\epsilon_1+\epsilon_2+ \ldots +\epsilon_N$).

According to another embodiment, a computer-implemented method can comprise generating, by a system, an approximate decomposition of a quantum gate. The computer-implemented method can further comprise setting, by the system, based on the approximate decomposition, a budget value ($C_{budget}$) for a C-factor that is a metric for increase in variance of quasi-probability sampling. The computer-implemented method can further comprise determining, by the system, an optimal decomposition for the quantum gate as a function of $C_{budget}$.

In an embodiment, the computer-implemented method can further comprise generating, by the system, the approximate decomposition utilizing the following equation: $[U] \approx \Sigma_{i=1}^{M}\alpha_i\varepsilon_i$. In an embodiment, U denotes a unitary corresponding to the quantum gate; M denotes decomposition size; $\alpha_i$ denotes quasi-probability coefficients; and $\varepsilon_i$ denotes quantum channels implementable on quantum hardware. In an embodiment, the C-factor=$C(\alpha_1, \ldots, \alpha_M):=\Sigma_{i=1}^{M}|\alpha_i|$. In an embodiment, the computer-implemented method can further comprise determining, by the system, the optimal decomposition utilizing the following equation: minimize$\|[U]-\Sigma_{i=1}^{M}d_i F_i\|$ over $\{d_i\}$. In an embodiment, $d_i$ denotes quasi-probability coefficients and $F_i$ denotes quantum channels implementable on quantum hardware.

In an embodiment, the computer-implemented method can further comprise minimizing, by the system, $\epsilon(\alpha_1, \ldots, \alpha_M)$ such that $C(\alpha_1, \ldots, \alpha_M) \leq C_{budget}$ where $\epsilon$ denotes error. In an embodiment, the computer-implemented method can further comprise distributing, by the system, the C-factor across N number of gates where N denotes an integer>1. In an embodiment, the computer-implemented method can further comprise distributing, by the system, the C-factor across the N gates to reduce a total sum of errors ($\epsilon_1+\epsilon_2+ \ldots +\epsilon_N$). In an embodiment, the computer-implemented method can further comprise generating, by the system, the optimal decomposition for a trace-preserving (TP) linear map $G(\rho)$ by finding quantum channels $\{\varepsilon_1, \varepsilon_2, \varepsilon_3, \ldots, \varepsilon_M\}$ and corresponding coefficients $\{\alpha_1, \alpha_2, \alpha_3, \ldots, \alpha_M\}$ such that: $G(\rho)=\Sigma_{i=1}^{M}\alpha_i\varepsilon_i$ and $\Sigma_{i=1}^{M}|\alpha_i|$ is minimal. In an embodiment, the computer-implemented method can further comprise setting, by the system, a rank constraint to $\leq 2$. In an embodiment, the rank constraint corresponds to dimensionality of ancilla Hilbert space, and $\varepsilon_i$ comprises ceiling($\log_2(\tau)$) ancilla qubits.

In an embodiment, the computer-implemented method can further comprise determining, by the system, an optimal decomposition utilizing an iterative algorithm that includes decomposing an error that is indicative of a total approximation error between a set of desired quantum channels and a set of approximation quantum channels. In an embodiment, the set of approximation quantum channels can be generated using a Stinespring dilation. In an embodiment, the computer-implemented method can further comprise using, by the system, variational unitary approximation to implement the Stinespring dilation. In an embodiment, the computer-implemented method can further comprise determining, by the system, an optimal variational unitary approximation utilizing the following equation: minimize$\|V_{St}-V(U_{Var}(\theta))\|_2$. In an embodiment, B denotes a tuple of a variational parameters; $V_{St}$ denotes a Stinespring isometry; $U_{Var}(\theta)$ denotes a unitary operation associated with the quantum gate as represented by a variational form; and $V(U_{Var}(\theta))$ denotes a submatrix of $U_{Var}(\theta)$ restricted on a subspace where ancilla qubits are fixed to a zero state.

According to another embodiment, a computer program product can comprise a computer readable storage medium having program instructions embodied therewith. The program instructions are executable by a processor to cause the processor to perform operations. The operations include generating an approximate decomposition of a quantum gate. The operations further include setting, based on the approximate decomposition, a budget value ($C_{budget}$) for a C-factor that is a metric for increase in variance of quasi-probability sampling. The operations further include determine an optimal decomposition for the quantum gate as a function of $C_{budget}$.

In an embodiment, the program instructions are executable by the processor to further cause the processor to perform additional operations. The additional operations can include generating the approximate decomposition utilizing the following equation: $[U] \approx \Sigma_{i=1}^{M} \alpha_i \varepsilon_i$, wherein U denotes a unitary corresponding to the quantum gate; M denotes decomposition size; $\alpha_i$ denotes quasi-probability coefficients; $\varepsilon_i$ denotes quantum channels that are implementable on hardware; and the C-factor=$C(\alpha_1, \ldots, \alpha_M):=\Sigma_{i=1}^{M}|\alpha_i|$. The additional operations can further include minimizing $\epsilon(\alpha_1, \ldots, \alpha_M)$ such that $C(\alpha_i, \ldots, \alpha_M) \leq C_{budget}$. The additional operations can further include distributing the C-factor across N number of gates, wherein N is an integer>1 to reduce a total sum of errors ($\epsilon_1+\epsilon_2+ \ldots +\epsilon_N$). The additional operations can further include determining the optimal decomposition utilizing the following equation: minimize$\|[U]-\Sigma_{i=1}^{M}d_iF_i\|$ {over $d_i$}, wherein: $d_i$ denotes quasi-probability coefficients; and $F_i$ denotes quantum channels that are implementable on hardware. The additional operations can further include generating the optimal decomposition for a trace-preserving (TP) linear map G($\rho$) by finding quantum channels $\{\varepsilon_1, \varepsilon_2, \varepsilon_3, \ldots, \varepsilon_M\}$ and corresponding coefficients $\{\alpha_1, \alpha_2, \alpha_3, \ldots, \alpha_M\}$ such that: G($\rho$)=$\Sigma_{i=1}^{M}\alpha_i\varepsilon_i$ and $\Sigma_{i=1}^{M}|\alpha_i|$ are minimal.

DESCRIPTION OF THE DRAWINGS

FIGS. 2A-2C illustrate example, non-limiting graphs depicting tradeoff curves obtained using a compensation method, a decompensation set comprising an Endo basis, and respective noisy variants of corresponding gates, in accordance with one or more embodiments described herein.

DETAILED DESCRIPTION

Figure 1:
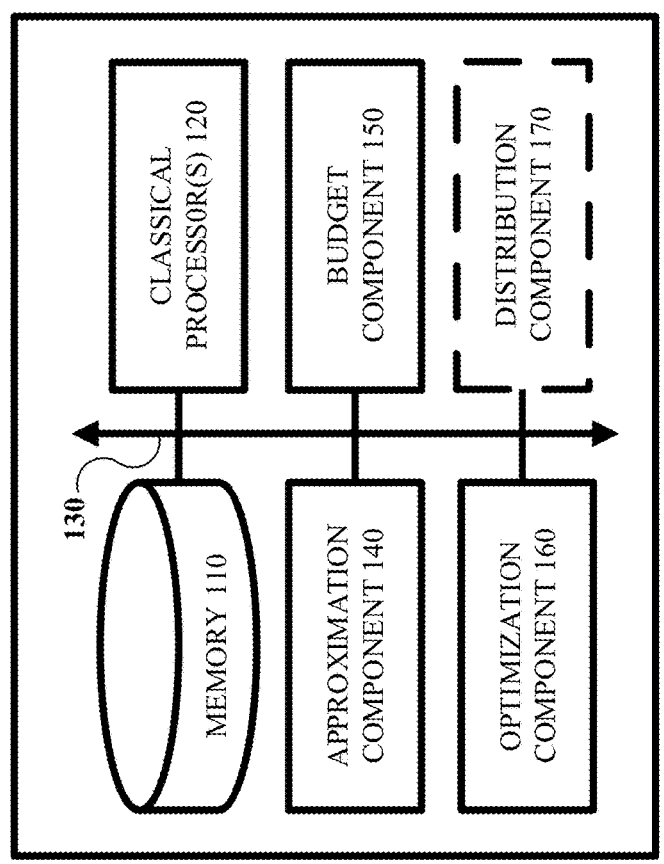
FIG. 1 illustrates a block diagram of an example, non-limiting system that can facilitate error mitigation for quantum computing devices, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Classical computers operate on binary digits (or bits) that store or represent information as binary states to perform computing and information processing functions. In contrast, quantum computing devices operate on quantum bits (or qubits) that store or represent information as both the binary states and superpositions of the binary states. To that end, quantum computing devices utilize quantum-mechanical phenomena, such as entanglement and interference.

A quantum computation uses a qubit as its essential unit instead of a classical computing bit. The qubit (e.g., quantum binary digit) is the quantum-mechanical analog of the classical bit. Whereas classical bits can employ on only one of two basis states (e.g., 0 or 1), qubits can employ on superpositions of those basis states (e.g., $\alpha|0\rangle+\beta|1\rangle$, where $\alpha$ and $\beta$ are complex scalars such that $|\alpha|^2+|\beta|^2=1$), allowing a number of qubits to theoretically hold exponentially more information than a same number of classical bits. Thus, quantum computers (e.g., computers that employ qubits instead of solely classical bits) can, in theory, quickly solve problems that can be extremely difficult for classical computers. The bits of a classical computer are simply binary digits, with a value of either 0 or 1. Almost any device with two distinct states can serve to represent a classical bit: a switch, a valve, a magnet, a coin, etc. Qubits, partaking of the quantum mystique, can occupy a superposition of 0 and 1 states. It's not that the qubit can have an intermediate value, such as 0.63; when the state of the qubit is measured, the result is either 0 or 1. But in the course of a computation, a qubit can act as if it were a mixture of states—for example: 63 percent 0 and 37 percent 1. General quantum programs require coordination of quantum and classical parts of a computation. One way to think about general quantum programs is to identify processes and abstractions involved in specifying a quantum algorithm, transforming the algorithm into executable form, running an experiment or simulation, and analyzing the results. A notion throughout these processes is use of intermediate representations. An intermediate representation (IR) of a computation is neither its source language description nor the target machine instructions, but something in between. Compilers may use several IRs during a process of translating and optimizing a program. The input is source code describing a quantum algorithm and compile time parameter(s). The output is a combined quantum/classical program expressed using a high-level IR. A distinction between a quantum and classical computer is that the quantum computer is probabilistic, thus measurements of algorithmic outputs provide a proper solution within an algorithm specific confidence interval. The computation is then repeated until a satisfactory probable certainty of solution can be achieved.

By processing information using laws of quantum mechanics, quantum computers offer novel ways to perform computation tasks such as molecular calculations, financial risk calculations, optimization and many more. However, sensitivity to noise and errors can prohibit near-term quantum computers from outperforming classical computers in performing such computation tasks. Fault tolerance (FT) through quantum error correction (QEC) provides a long-term solution for mitigating such noise and error sensitivity. Yet, FT through QEC involves substantial computing resources (e.g., millions of qubits) that are beyond the scope of near-term quantum computers. Quantum error mitigation (QEM) provides an intermediate solution for mitigating noise and error sensitivity on near-term quantum computers without the promise of full FT.

The following recurring notations are used throughout the present disclosure:

Hilbert spaces are denoted with alphabetic subscripts $H_A$, $H_B$, . . . and interchangeably reference them by A, B, . . . . The tensor products of two Hilbert spaces $H_A \otimes H_B$ are also written as AB.

Density matrices: A set of density matrices on a system A are denoted as:

$S(A):=\{\rho \in End(H_A) | \rho \geq 0, [\rho]=1\}$.

Linear operators: Linear maps from a system A to a system B are denoted as:

$L(A,B):=Hom(H_A H_B)$ $L(A):=L(A,A)$.

Unitary operators: Unitary maps on a system A are denoted as:

$U(A):=\{U \in L(A) | U^\dagger = U\}$.

Quantum channels:

$TP(A,B):=\{\varepsilon \in L(L(A), L(B)) | \varepsilon \text{ is trace-preserving}\}$ $CP(A,B):=\{\varepsilon \in L(L(A), L(B)) | \varepsilon \text{ is completely positive}\}$ $TPCP(A,B):=TP(A,B) \cap CP(A,B)$ Unitary quantum channels: For some unitary $U \in U(A)$, the induced quantum channel is denoted as:

$[U](\rho): = U \rho U^\dagger$

FIG. 1 illustrates a block diagram of an example, non-limiting system 100 that can facilitate error mitigation for quantum computing devices, in accordance with one or more embodiments described herein. System 100 includes memory 110 for storing computer-executable components and one or more classical processors 120 operably coupled via one or more communication busses 130 to memory 110 for executing the computer-executable components stored in memory 110. As shown in FIG. 1, the computer-executable components include: approximation component 140, budget component 150, and optimization component 160.

Approximation component 140 can generate an approximate decomposition of a quantum gate. In an embodiment, the approximation component 140 can generate the approximate decomposition utilizing the following equation: $[U] \approx \sum_{i=1}^{M} \alpha_i \varepsilon_i$ where: U denotes a unitary corresponding to the quantum gate; M denotes decomposition size; $\alpha_i$ denotes quasi-probability coefficients; and $\varepsilon_i$ denotes quantum channels that are implementable on hardware. In an embodiment, the C-factor=$C(\alpha_1, \ldots, \alpha_M):=\sum_{i=1}^{M} |\alpha_i|$. Budget component 150 can set, based on the approximate decomposition, a budget value ($C_{budget}$) for a C-factor that is a metric for increase in variance of quasi-probability sampling.

Optimization component 160 can determine an optimal decomposition for the quantum gate as a function of $C_{budget}$. In an embodiment, optimization component 160 can minimize $\epsilon(\alpha_1, \ldots, \alpha_M)$ such that $C(\alpha_1, \ldots, \alpha_M) \leq C_{budget}$ where $\epsilon$ denotes error. In an embodiment, optimization component 160 determines the optimal decomposition utilizing the following equation: minimize $\|[U] - \sum_{i=1}^{M} d_i F_i\|$ over $\{d_i\}$, where: $d_i$ denotes quasi-probability coefficients; and $F_i$ denotes quantum channels implementable on quantum hardware. In an embodiment, optimization component 160 generates the optimal decomposition for a trace-preserving (TP) linear map $G(\rho)$ by finding quantum channels $\{\varepsilon_1, \varepsilon_2, \varepsilon_3, \ldots, \varepsilon_M\}$ and corresponding coefficients $\{\alpha_1, \alpha_2, \alpha_3, \ldots, \alpha_M\}$ such that: $G(\rho) = \sum_{i=1}^{M} \alpha_i E_i$ and $\sum_{i=1}^{M} |\alpha_i|$ is minimal. In an embodiment, optimization component 160 sets a rank constraint to $<=r$, for a positive integer r, where the rank constraint corresponds to dimensionality of ancilla Hilbert space and $\varepsilon_i$ comprises ceiling($\log_2(r)$) ancilla qubits.

In an embodiment, the computer-executable components stored in memory 110 further include distribution component 170. Distribution component 170 can distribute the C-factor across N number of gates where N is an integer value greater than one. In an embodiment, distribution component 170 distributes the C-factor across the N gates to reduce a total sum of errors ($\epsilon_1 + \epsilon_2 + \ldots + \epsilon_N$). The functionality of the computer-executable components utilized by the embodiments will be covered in greater detail below.

Section 1—Quasiprobability Method

Consider n-qubit and m-qubit Hilbert spaces $H_A$, $h_B$ and a linear operator $F \in L(L(A), L(B))$. In some instances, it can be desireable to execute F on n qubits of a quantum computer that are initially in the state $\rho_{in}$. However, some quantum hardware utilized in implementing quantum computers is prone to noise, which leads to an approximate execution of T. If the accuracy of the quantum computer is too low, it can render some potential applications impractical. One example of interest can be that F is a unitary operation representing some quantum gate in a quantum circuit. If the noise of the executed operation exceeds a defined upper threshold, the statistics of measurements obtained at the end of the quantum circuit can differ so strongly from optimum that retrieving any useable information from such measurements becomes impractical. Other examples of interest can be instances where F is not unitary or even a non-physical operation. As used herein, the terms "physical operation" and "Trace Preserving, Completely Positive" or "TPCP" are interchangeable.

The quasiprobability method can facilitate implementing F on average without error on noisy hardware. More precisely, the quasiprobability method accesses a random state that can be sampled independently in every run of the experiment rather than accessing the quantum state $F(\rho_{in})$ itself. This random state exhibits the same expectation values as $F(\rho_{in})$ for the outcomes of any measurement. As discussed in greater detail below with respect to Section 1.2, this comes at a cost in the form of a sampling overhead or C-factor.

The quasiprobability method can facilitate many types of quantum algorithms that generally only utilize expectation values at the end of the quantum circuit, such as Variational Quantum Eigensolvers, iterative quantum phase estimation, and the like. In these types of quantum circuits, noisy gates can be used to simulate the ideal gates by using the quasiprobability method, and thus obtain the ideal expectation value for the measurement at the end of the quantum circuit.

Section 1.1—Quasiprobability Sampling

A quasiprobability decomposition (QPD) of the linear operator $F \in L(L(A), L(B))$ is a finite set of tuples $\{(\alpha_i, \varepsilon_i)\}_i$ with $\alpha_i \in \mathbb{R}$ and quantum channels $\varepsilon_i \in TPCP(A, B)$ such that:

$$\mathcal{F}(\rho) = \sum_i a_i \mathcal{E}_i(\rho), \forall \rho \in \text{End}(\mathcal{H}_n) \quad \text{Equation 1}$$

In accordance with Equation 1, $\{\varepsilon_i\}_i$ denotes the decomposition set of the QPD. The quasiprobability method considers a QPD $\{(\alpha_i, \varepsilon_i)\}_i$ where the maps $\varepsilon_i$ correspond to operations that can be implemented on quantum hardware. For example, the maps $\varepsilon_i$ can correspond to a quantum channel of a noisy quantum gate. In an embodiment, the maps $\varepsilon_i$ can be obtained by using: tomography; prior knowledge of the experimental noise; or a combination thereof. In some instances, it can be desirable to obtain the expectation value of a projective measurement described by a Hermitian operator O, which can be performed after the operation F. That is, in such instances, computing the expectation value $[OF(\rho)]$ of that variable can be desirable given a certain input state p. The linearity of the trace implies that:

$$Tr[O\mathcal{F}(\rho)] = C \sum_i \frac{|a_i|}{C} sgn(a_i) Tr[O\mathcal{E}_i(\rho)] \quad \text{Equation 2}$$

Equation 2 introduces the C-factor, $C := \Sigma_i \alpha_i$. The right-hand side of Equation 2 facilitates constructing an unbiased estimator for $[OF(\rho)]$, while only having access to the operations $\varepsilon_i$ of the noisy quantum hardware. To that end, a random number i with probability $|\alpha_i|/C$ is chosen and the operation $\varepsilon_i$ is performed, which is followed by the measurement O. In an embodiment, the estimator for $[OF(\rho)]$ is unbiased in that it corresponds with a correct expectation value. The output of the unbiased estimator is the outcome of the measurement 0 weighted by the coefficient $Csgn(\alpha_i)$. By sampling the unbiased estimator a number of times and considering the average value, an arbitrarily precise estimate of the true expectation value $[O(\rho)]$ can be obtained.

Remark 1.2—In practice, $\varepsilon_i$ operations can be imperfect estimates of the true underlying quantum channels, produced by tomography. Unfortunately, tomography can be incapable of providing an arbitrarily precise estimate of the true underlying quantum channels due to state preparation and measurement (SPAM) errors. With erroneous knowledge of the $\varepsilon_i$, the QPD can have erroneous quasi-probability coefficients $a_i$, which can translate into an error in the estimator of the expectation value. In some instances, this problem can be circumvented by using a specific type of tomography, gate set tomography (GST), that can give a self-consistent estimate of the SPAM errors. While the estimate of $\varepsilon_i$ obtained using GST can still be erroneous, this estimator of the quasiprobability method remains unbiased. In other instances, QPD coefficients can be learned ab-initio without the need of explicit tomography. In other instances, quantum channels can be characterized without being affected by the error induced by SPAM errors.

Generally, the issue of tomography errors is not insurmountable for small-scale implementations on current quantum hardware, since the single-qubit gate errors occuring during SPAM are significantly lower than the two-qubit gate errors that can be corrected using the quasiprobability method. Therefore, a significant improvement in accuracy can be realized using the quasiprobability method in such implementations. In view of the foregoing, the issue of tomography errors can be treated as separate and independent from the errors addressed below. As such, the issue of tomography errors will not be addressed below.

Section 1.2—Sampling Overhead and the C-Factor

The quasiprobability estimator constructed above generally does not retain the full statistics of the outcome $[OF(\rho)]$. Rather that quasiprobability estimator only conserves the expectation value. Moreover, the variance of the foregoing quasiprobability estimator increases with $O(C^2)$. This implies that in some instances $O(C^2)$ more shots can be needed to estimate $Tr[OF(\rho)]$ with the same confidence as can be realized by perfectly implementing Some additional notation can facilitate formulating the previous statement more precisely. Consider a random variable X which is distributed according to the outcomes of the measurement of O on $F(\rho)$. Similarly, $Y_i$ are random variables distributed according to the outcomes of the measurement O on $\varepsilon_i(\rho)$. For simplicity, the following example considers the case where O is a binary measurement with the two possible outcomes: 0 and 1. This corresponds to the setting that is relevant for error-mitigated quantum computing. As such, the X and $Y_i$ are binomial distributions, and thus fully characterized by their expectation values that are denoted by μ and $m_i$, respectively. Let I be a discrete random variable taking as value one of the indices i with probability $$\mathbb{P}[I = i] = \frac{a_i}{C}.$$

The outcome of this quasiprobability sampling estimator is thus modelled by a random variable Z: $=Csgn(\alpha_i)Y_1$. The behavior of the variance of Z compared to the reference variance of X (i.e., if F could be implemented perfectly on quantum hardware) is given, as expressed by Equation 3:

Lemma 1.3—Consider the setup described above. Then, $$\mathrm{Var}[Z] \leq \mathrm{Var}[X] + C^2 \qquad \text{Equation 3}$$

with equality for some choice of $m_i$ and $\mu$.

If N samples of the disclosed quasiprobability sampling estimator are obtained, the variance of the averaged result will be reduced to Var $[Z]/N$. This implies one practical implication of Equation 3. In particular, the number of samples that facilitate reducing the error of the disclosed quasiprobability sampling estimator to some fixed constant scales as $O(C^2)$.

Proof—This practical implication can be demonstrated using the law of total variance, as presented below with respect to Equations 4 and 5:

$$\mathrm{Var}[Z] = \mathbb{E}_I[\mathrm{Var}[Z \mid I]] + \mathrm{Var}_I[\mathbb{E}[Z \mid I]] \qquad \text{Equation 4}$$

$$= \sum_i \mathbb{P}[I = i]\mathrm{Var}[Z \mid I = i] + \sum_i \mathbb{P}[I = i](\mathbb{E}[Z \mid I = i] - \mathbb{E}[Z])^2 \qquad \text{Equation 5}$$

Inserting the respective definitions of I, Z and $Y_i$ results in the following relationship:

$$\mathrm{Var}[Z] = \sum_i |a_i| \left( C m_i (1 - m_i) + \frac{(C \mathrm{sgn}(a_i) m_i - \mu)^2}{C} \right) \qquad \text{Equation 6}$$

which can be rewritten as:

$$\mathrm{Var}[Z] = \frac{1}{C} \sum_i |a_i| [C^2 m_i - 2 C \mathrm{sgn}(a_i) m_i \mu + \mu^2] = \qquad \text{Equation 7}$$

$$C \sum_i |a_i| m_i - 2\mu^2 + \mu^2$$

where $\varepsilon_i \alpha_i m_i = \mu$. In view of the foregoing, Equation 8 is obtained:

$$\mathrm{Var}[Z] = \mathrm{Var}[X] + C \sum_i |a_i| m_i - \mu \qquad \text{Equation 8}$$

The second term on the right-hand side of Equation 8 reaches its maximum of $C^2$ when all $m_i = 1$ and the third term vanishes when $\mu = 0$, so the desired inequality follows directly. An example of random variables Y, $X_i$ can be constructed that saturates these bounds, while still fulfilling $Y = \Sigma_i \alpha_i X_i : m_i = 1$, $\alpha_i = \pm 1$ and $\mu = 0$.

In view of the foregoing considerations, the C-factor can be chosen as a measure of quality for a QPD. A desired operation F can typically have infinitely many QPDs into operations that quantum hardware can execute. Hence, it can be important to find a QPD with a minimal or lowest possible C-factor. An example of finding a QPD with a minimal or lowest possible C-factor will be discussed in greater detail below with respect to Section 1.5.

Technically, the C-factor can be construed as a worst-case metric for the increase in variance of the quasiprobability sampling, as there is no guarantee that the inequality in Lemma 1.3 is close to being saturated. However, it can be unlikely to get a better bound in practice, as we do not have access to the expectation value, $m_i$, characterizing random variable $Y_i$ during the computation of an optimal QPD. This is because in practice a gate being corrected by QPD is generally part of a much larger circuit with many other gates occurring before and after that gate. As such, the other gates of the larger circuit will also be corrected by QPD. Therefore, C can be used as a proxy estimate for the sampling overhead.

Section 1.3—Quasiprobability Decompositions of Multiple Operations

The foregoing introduction to the disclosed quasiprobability method considers the simplest case where a single quantum gate operation is simulated using noisy operations. The following considers how the disclosed quasiprobability method can be applied to large quantum circuits comprising multiple quantum gate operations. In some instances, it may be desirable to try to directly find a QPD of a multi-gate quantum circuit as a whole. However, this approach is generally unfeasible in practice. For example, finding a QPD of a multi-gate quantum circuit is an optimization problem that involves an exponential amount of resources in terms of the number of qubits involved, as will be discussed in greater detail below with respect to Section 1.5. So a more feasible approach can be to find a QPD of each quantum gate individually, and then combine them together into one large QPD of the multi-gate quantum circuit as a whole. As will be discussed in greater detail below, while computationally tractable, this localized approach comes at a cost. That cost involves having no guarantee that an obtained QPD is associated with a minimal or lowest possible C-factor, since an optimal total QPD is unlikely to be separable into QPDs of the individual gates.

The following disclosure discusses how the QPDs of two separate operations naturally lead to a QPD of the concatenation of both. Note that showing this for the concatenation also directly implies that it also works for the tensor product of the two operations. Using this argument iteratively, a QPD of the total circuit can be constructed from the QPDs of the individual gates.

Consider two linear operators $F_1 \in L(L(A), L(A'))$, $F_2 \in L(L(A'), L(A''))$ applied in succession on some quantum state $\rho \in S(A)$. Suppose a QPD of each is denoted as $\{(\alpha_i, \varepsilon_i)\}$ and $\{(b_j, G_j)\}$, respectively. Together they naturally lead to a QPD of $F_2 \circ F_1$:

$$(\mathcal{F}_2 \circ \mathcal{F}_1)(\rho) = C_1 C_2 \sum_{i,j} \frac{|a_i||b_j|}{C_1 C_2} \mathrm{sgn}(a_i) \mathrm{sgn}(b_j) (\mathcal{G}_j \circ \mathcal{E}_i)(\rho), \qquad \text{Equation 9}$$

$$\forall \rho \in \mathrm{End}(\mathcal{H}_n)$$

Equation 9 shows that the combined C-factor scales in a multiplicative way. Therefore, for a circuit comprising N gates corrected by the quasiprobability method, the C-factor of the total circuit ($C_{tot}$) can be given by the product of the individual C-factors. That is, $C_{tot} = \Pi_{i=1}^{N} C_i$. While this exponential cost associated with correcting a number of gates by the quasiprobability method can be a heavy price to pay, it is maybe not too surprising. If there were no such drawback, the quasiprobability method could allow for fault-tolerant quantum computation without the harsh resource requirements found in quantum error correction, such as high gate fidelities, large numbers of ancilla qubits, and the like.

Storing the QPD of the full circuit itself can become practically unmanageable, as it could involve storing an amount of quasiprobility amplitudes that increases exponentially as the number of gates increase. Nevertheless, the product form in Equation 9 facilitates implementing the quasiprobability sampling estimator efficiently. Consider a sequence of m operation $F_m \circ F_{m-1} \circ \ldots \circ F_1$ followed by a measurement described by the observable O. For each operation $F_k$ a QPD $\{(a_i^{(k)}, \varepsilon_i^{(k)})\}$ with C-factor $C_k$ is given. In a first step, the disclosed quasiprobability estimator samples a random number $i_1$ according to the probability distribution $|\alpha_i^{(1)}|/C_1$ and executing the operation $\varepsilon_{i_1}^{(1)}$. In a second step, the disclosed quasiprobability estimator samples a random number $i_2$ according to the probability distribution $|\alpha_i^{(2)}|/C_2$ and execute the operation $\varepsilon_{i_2}^{(2)}$. This procedure is repeated for all m operations while keeping track of all indices $i_1, \ldots, i_m$ sampled along the way. At the very end, the observable O on the system can be measured. The quasiprobability estimator then outputs the outcome of that measurement multiplied by $\text{sgn}(\Pi_{i=k}^m \alpha_{i_k}^{(k)}) \Pi_{i=k}^m C_k$.

In some embodiments, certain assumptions on gate noise facilitate combining QPDs of individual parts of a circuit into a QPD of the total circuit. For example, one assumption can be that the gate noise is localized and Markovian. This example assumption can be construed as meaning that the noise on any quantum gate must be completely uncorrelated with other noise and independent on what operations were performed previously on the circuit. Unfortunately, in some instances, quantum hardware exhibits significant correlations in the noise on operations which are spatially and temporally separated.

Section 1.4—Existence of a QPD and the Endo Basis

The following disclosure considers, for a given quantum hardware, whether there even exists a QPD of F into operations that the quantum hardware can implement. This consideration appears challenging, as it would seem to depend on the exact details of the capabilities of the quantum hardware. For example, this consideration can depend on what kind of quantum operations the quantum hardware can implement and at what fidelity the quantum hardware does so. However, it has been realized that the requirements on the quantum hardware can be very few and can generally be fulfilled on quantum hardware that is sufficiently accurate, assuming that F is Hermitian-preserving. This assumption is very natural, as the $\varepsilon_i$ is generally Hermitian-preserving due to the physicality constraint. Moreover, any linear combination of Hermitian-preserving maps is itself Hermitian-preserving. Note that the disclosed quasiprobability method does not generally call for the $\varepsilon_i$ (and therefore F) to be trace-preserving, as non-tracepreserving maps can be simulated using measurements and postselection, as discussed below.

The assumption that F is Hermitian-preserving (i.e., $\rho$ Hermitian$\Rightarrow F(\rho)$) implies that the 4×4 Pauli Transfer Matrix (PTM) $R_F$ of F only has real entries. The following considers the set of 16 single-qubit basis operations listed below in Table 1, which will hereinafter be referred to as the Endo basis. Each basis operation comprising the Endo basis can be realized using a Hadamard gate [H], a phase gate [S], a measurement-postselection operator [$P_0$](where $P_0$: =00+01), or a combination thereof. A measurement-postselection operation can be simulated in the context of the quasiprobability sampling estimator by performing a measurement in the computational basis and aborting if the outcome is 1 (here aborting means that the estimator outputs 0). It can be shown that each basis operation comprising the Endo basis are linearly independent, for example, by considering their respective PTM representations. Since any Hermitian-preserving map can be represented as a real 4×4 PTM, any Hermitian-preserving map can be decomposed into one or more basis operations of the Endo basis that each correspond to a linerarly independent real 4×4 matrix.

TABLE 1

[1] (no operation)
$[\sigma^X] = [H][S]^2[H]$
$[\sigma^Y] = [H][S]^2[H][S]^2$
$[\sigma^Z] = [S]^2$ $[R_X] = \left[\dfrac{1+i\sigma^X}{\sqrt{2}}\right] = [H][S]^3[H]$ $[R_Y] = \left[\dfrac{1+i\sigma^Y}{\sqrt{2}}\right] = [S][H][S]^3[H][S]^3$ $[R_Z] = \left[\dfrac{1+i\sigma^Z}{\sqrt{2}}\right] = [S]^3$ $[R_{YZ}] = \left[\dfrac{\sigma^Y+\sigma^X}{\sqrt{2}}\right] = [H][S]^3[H][S]^2$ $[R_{ZX}] = \left[\dfrac{\sigma^X+\sigma^Y}{\sqrt{2}}\right] = [S]^3[H][S]^3[H][S]^3$ $[R_{XY}] = \left[\dfrac{\sigma^X+\sigma^X}{\sqrt{2}}\right] = [H][S]^2[H][S]^3$ $[\pi_X] = \left[\dfrac{1+\sigma^X}{2}\right] = [S][H][S][H][P_0][H][S]^3[H][S]^3$ $[\pi_Y] = \left[\dfrac{1+\sigma^X}{2}\right] = [H][S]^3[H]P_0[H][S][H]$ $[\pi_Z] = \left[\dfrac{1+\sigma^Z}{2}\right] = [P_0]$ $[\pi_{YZ}] = \left[\dfrac{\sigma^Y+i\sigma^Z}{2}\right] = [S][H][S][H][P_0][H][S][H][S]^3$ $[\pi_{ZX}] = \left[\dfrac{\sigma^Z+i\sigma^X}{2}\right] = [H][S]^3[H][P_0][H][S][H][S]^2$ $[\pi_{XY}] = \left[\dfrac{\sigma^X+i\sigma^Y}{2}\right] = [P_0][H][S]^2[H]$ Note that the last 6 basis operations comprising the Endo basis are not trace-preserving, due to the measurement-postselection operator. The inclusion of such non-trace-preserving operations facilitates decomposing maps F which are proportional to non-trace-preserving maps. Alternatively, only maps F that are proportional to a trace-preserving map could be decomposed, as any linear combination of trace-preserving maps will be proportional to another trace-preserving map.

The above argument involves utilizing a quantum computer that is capable of implementing [H], [S] and [$P_0$] exactly. While this is not the case, a useful quantum computer will be able to approximate [H], [S] and [$P_0$] reasonably well. As long as the fidelity of that approximations is sufficient, the approximate basis operations of the Endo basis will remain linearly independent. This is formalized below in Lemma 1.5.

Lemma 1.5—Denote by $B_i^{(O)}$ the elements of the Endo basis and by $B_i$ an approximation thereof. These operators are represented as their PTM (i.e., as 4×4 matrices). Equation 10 defines:

$$\varepsilon_{max} := \max\{\|B_i - B_i^{(O)}\|_\infty | i = 1, \ldots, 16\} \quad \text{Equation 10}$$

In accordance with the definition provided by Equation 10, the $B_i$ are linearly independent when $$\varepsilon_{max} < \frac{13 - 3\sqrt{17}}{32} \approx 0.0351.$$

In some embodiments, the $B_i$ can remain linearly independent above the approximated threshold of 0.0351. The construction of a universal decomposition set can be translated to n-qubit operations F for n>1. The basis of choice can be given by the tensorproducts of the Endo basis elements. In some embodiments, the disclosed quasiprobability method can decompose F into $16^n$ basis operations.

Section 1.5—Finding the Optimal QPD for a Fixed Decomposition Set

The foregoing disclosure of Section 1.4 demonstrated that in practice there always exists a decomposition set within which a QPD of a desired operation F can be found. The following disclosure considers an instance with a fixed decomposition set $\{\varepsilon_i\}_i$ where it is desirable to find optimal (in terms of lowest possible C-factor) quasiprobability coefficients $\alpha_i$ such that Equation 1 is fulfilled. If that fixed decomposition set comprises linearly independent operations (e.g., by using the Endo basis), then this optimization problem corresponds to solving a specific set of linear equations. However, some instances involve a more general case in which infinite possible solutions exist, as will be discussed below with respect to Section 1.7.

In this instance, the optimization problem can be written in terms of a linear program (LP), as expressed by Equation 11:

$$\begin{cases} \min_{a_i \in \mathbb{R}} & \sum_i |a_i| \\ \text{s.t.} & \mathcal{F} = \sum_i a_i \varepsilon_i \end{cases} \quad \text{Equation 11}$$

By introducing additional optimization variables $b_i$, the optimization problem of Equation 11 can be rewritten as:

$$\begin{cases} \min_{a_i \in \mathbb{R}, b_i \in \mathbb{R}} & \sum_i b_i \\ \text{s.t.} & \mathcal{F} = \sum_i a_i \varepsilon_i \text{ and } -b_i \leq a_i \leq b_i \end{cases} \quad \text{Equation 12}$$

Selecting an isomorphic matrix representation of the involved quantum operations or quantum channels can facilitate translating the constraint $F = \Sigma_i \alpha_i \varepsilon_i$ for a mathematical optimization algorithm. Examples of suitable isomorphic matrix representations include: Choi representations, PTM representations, and the like.

As a final remark, it can be noted that the number of constraints in the LP of Equation 11 is $16^n$ where n is the number of qubits involved in the operation (under the assumption that the channels are represented as Choi or PTM matrices). This exponential cost means that in some instances the LP can not be used to compute a QPD of large circuit blocks. In practice, the LP of Equation 11 can be used to find the QPD of every one- and two-qubit gate in a given circuit and then uses the construction in Section 1.3 to implement a quasiprobability sampling estimator for the whole circuit.

Section 1.6—Channel Difference Decomposition

This section expands on the foregoing disclosure of Section 1.5 and considers an optimal QPD of an operation F without a fixed decomposition set. More concretely, the following disclosure seeks to generalize the optimization problem of Equation 11 to not only optimize over the $\alpha_i$, but also over the $\varepsilon_i$. In some instances, the following disclosure relates to an ideal quantum computer that can implement any physical map, so the only restriction on the $\varepsilon_i$ will be that they must be trace-preserving and completely positive. The fact that the $\varepsilon_i$ are trace-preserving implies that embodiments of the present disclosure facilitate finding QPDs for F that are either trace-preserving or are related to a trace-preserving map by a scaling factor.

For convenience, the following disclosure represents quantum operations by their corresponding Choi matrices. The following disclosure denotes the Choi matrix of F by $\Lambda_F$ and seeks to construct a finite set of Choi matrices $\{\Lambda_{\varepsilon_i}\}_i$ that can correspond to a decomposition set $\{\varepsilon_i\}_i$. The Choi representation is very convenient, as it facilitates formulating the TPCP-condition on the decomposition basis in a straightforward way as: $\Lambda_{\varepsilon_i} \geq 0$ and $$Tr_2[\Lambda_{\varepsilon_i}] = \frac{1}{2^n} \mathbb{1}$$

for all i where $Tr_2$ stands for the partial trace over the ancillary Hilbert space of the Choi-Jamiolkowski isomorphism and n is the number of qubits involved in F.

With the above preparation, the optimization problem can be expressed as:

$$\begin{cases} \min_{a_i \in \mathbb{R}, \Lambda_{\varepsilon_i} \in \mathbb{C}^{4^n \times 4^n}} & \sum_{i=1}^{2^{5n}} |a_i| \\ \text{s.t.} & \Lambda_F = \sum_{i=1}^{2^{5n}} a_i \Lambda_{\varepsilon_i} \\ & \Lambda_{\varepsilon_i} \geq 0 \\ & Tr_2[\Lambda_{\varepsilon_i}] = \frac{1}{2^n} \mathbb{1} \end{cases} \quad \text{Equation 13}$$

In Equation 13, the maximal number of elements in the decomposition set is limited to $2^{5n}$. In an embodiment, $2^{5n}$ corresponds to the maximal possible number linearly independent complex $4^n \times 4^n$ matrices. In an embodiment, any optimal QPD of F into more than $2^{5n}$ TPCP maps can be rewritten as an equivalent QPD into $2^{5n}$ TPCP maps.

The optimization problem of Equation 13 has a quadratic constraint $\Lambda_F = \Sigma_{i=1}^{2^{5n}} \alpha_i \Lambda_{\varepsilon_i}$. In some instances, optimization problems of this type can generally be NP-hard to solve in terms of nondeterministic polynomial time complexity. In these instances, a substitution facilitates obtaining an optimization problem with a linear constraint. First, a distinction can be added between positive and negative quasiprobability coefficients, as expressed in Equation 14.

$$\Lambda_F = \sum_{i=1}^{2^{Sa}} a_i^+ \Lambda_{\varepsilon_i}^+ - \sum_{i=1}^{2^{Sa}} a_i^- \Lambda_{\varepsilon_i}^- \quad \text{Equation 14}$$

With $\alpha_i^\pm \geq 0$, $\tilde{\Lambda}_i^\pm$ can be defined as $\tilde{\Lambda}_i^\pm := \alpha_i^\pm \Lambda_{\varepsilon_i}^\pm$. In this way, the optimization problem of Equation 13 can be reformulated in terms of the optimization problem as expressed by Equation 15.

$$\begin{cases} \min_{a_i^\pm \in \mathbb{R}^+, \tilde{\Lambda}_{\varepsilon_i}^\pm \in \mathbb{C}^{4^n \times 4^n}} & \sum_{i=1}^{2^{5n}} |a_i| \\ \text{s.t.} & \Lambda_{\mathcal{F}} = \sum_{i=1}^{2^{5n}} \tilde{\Lambda}_{\varepsilon_i}^+ - \sum_{i=1}^{2^{5n}} \tilde{\Lambda}_{\varepsilon_i}^- \\ & \tilde{\Lambda}_{\varepsilon_i}^\pm \geq 0 \\ & Tr_2[\tilde{\Lambda}_{\varepsilon_i}^\pm] = \frac{1}{2^n}\mathbb{1} \end{cases}$$

Equation 15

The optimization problem of Equation 15 is a semidefinite program (SDP). Reformulating the optimization problem of Equation 13 as an SDP facilitates efficiently finding an optimal QPD using any number of known algorithms in mathematical optimization that solve such SDPs.

Lemma 1.6—In some instances, the SDP of Equation 15 has a feasible solution iff F is Hermitian-preserving and proportional to a trace-preserving map.

Proof—By way of example, consider an instance in which a feasible solution can be found such that Equation 14 is fulfilled. Then one has:

$$Tr_2[C_{\mathcal{F}}] = \sum_i a_i^+ Tr_2[C_{\varepsilon_i}^+] - \sum_j a_j^- Tr_2[C_{\varepsilon_i}^+] = \left(\sum_i a_i^+ - \sum_j a_j^-\right) \frac{1}{2^n}\mathbb{1}.$$

Equation 16

Similarly, in this example, F must be Hermitian-preserving because the $\varepsilon_i$ are Hermitian-preserving.

In the case of n=1 the real vector space of Hermitian-preserving maps is 16-dimensional. Additionally, implementing trace-preservingness is equivalent to imposing a restriction corresponding to 3 linear constraints when considering how TP manifests on the Choi matrix. As such, the space of Hermitian-preserving trace-preserving maps is (at most) 13-dimensional. If 13 linearly independent TPCP maps are found, then those 13 TPCP maps can form a valid decomposition basis for any such F. 10 of those 13 TPCP maps are known from the Endo basis, namely [1], [$\sigma^X$], [$\sigma^Y$], [$\sigma^Z$], [$R_X$], [$R_Y$], [$R_Z$] (See Table 1). The remaining 3 TPCP maps that fulfill the aforementioned properties are:

$$\frac{[\pi_X] + [\pi_{YZ}]}{2}, \frac{[\pi_Y] + [\pi_{ZX}]}{2}, \frac{[\pi_Z] + [\pi_{XY}]}{2}.$$

The linear independence of the remaining 3 TPCP maps follows from the linear independence of the Endo basis. The remaining 3 TPCP maps are also TP and CP for reasons that should be apparent to one skilled in the art.

Moreover, the optimal decomposition in the form of Equation 13 into quantum channels generally involves, at most, two quantum channels. This aspect of the optimal decomposition in the form of Equation 13 is useful in practice in as much as implementation involves constructing an SDP with two variables rather than an SDP with $\sim 2^{5n}$ variables.

Theorem 1.7 (Channel Difference Decomposition)—Let $F \in End(End(H_n))$ be a Hermitian-preserving map proportional to a trace-preserving map. Then there exist TPCP maps $\varepsilon^+$, $\varepsilon^- \in End(End(H_n))$ and $a^+$, $a^- \geq 0$ such that $$F = \alpha^+ \varepsilon^+ - \alpha^- \varepsilon^-$$

Equation 17

In accordance with Equation 17, the C-factor of this QPD $\alpha^+ + \alpha^-$ is optimal over all possible QPDs in TPCP maps of the form of Equation 13. Hereinafter, the decomposition of Equation 17 is referred to as the channel difference decomposition (CDD).

Proof—Consider one set of variables $\alpha_i^+$, $\alpha_i^-$, $\varepsilon_i^+$, $\varepsilon_i^-$ that minimizes the SDP in Equation 15. Such a minimum can be achieved, as the SDP minimizes a continuous objective function over a compact set. To see the compactness, consider that set of density matrices is compact and that an upper bound for the value of $|\alpha_i|$ is provided by the C-factor of a non-optimal solution. The foregoing considerations must exist when the SDP of Equation 15 has a feasible solution iff F is Hermitian-preserving and proportional to a trace-preserving map.

As discussed below with respect to Equations 18 and 19, embodiments of the present disclosure can reduce any optimal decomposition to two quantum channels.

$$a^+ := \sum_i a_i^+, \quad a^- := \sum_i a_i^+$$

Equation 18

$$\varepsilon^+ := \frac{1}{a^+} \sum_i \varepsilon_i^+, \quad \varepsilon^- := \frac{1}{a^-} \sum_i \varepsilon_i^-$$

Equation 19

By definition, Equations 18 and 19 fulfills Equation 17. It is also straightforward to verify that $\varepsilon^\pm$ are TPCP maps. Moreover, the C-factor $\alpha^+ + \alpha^-$ of the CDD can be seen as a measure of the non-physicality of a certain Hermitian-preserving TP map F. If F is TPCP, then $\alpha^+ + \alpha^- = 1$, and the value becomes larger the more 'unphysical' the TP map gets. The operational interpretation of this measure is that it corresponds to the C-factor associated with simulating a certain operation on an ideal quantum computer, which could implement any TPCP map.

Section 1.7—Numerical Demonstration

The following example demonstration involves computing the QPD required to correct a noisy quantum gate. The example demonstration denotes the ideal unitary corresponding to the gate as U. As discussed above, attempting to execute such a gate on a noisy quantum computer actually implements a noisy quantum channel A that approximates [U]. The example quasiprobability decomposition demonstration involves three choices of U: a single-qubit Ry rotation with angle 2 arccos $\sqrt{0.56789}$; a two-qubit CNOT gate; and a two-qubit SWAP gate.

In this example demonstration, the CVXPY package for disciplined convex programming in the Python programming language was used to solve the optimization problems. The MOSEK optimization software available from Mosek ApS of Copenhagen, Denmark was used as solver for the SDP of the CDD. The noisy channels A of these three gates are computed from a noise model included in the Qiskit quantum development kit available from International Business Machine Corp. of Armonk, New York. In particular, the noise model used to compute the noisy channels A of these three gates was generated from calibrations measurements of the IBMQ Melbourne hardware backend. Table 2 depicts how well A approximates [U], in terms of process fidelity and diamond norm.

TABLE 2

|  | Ry | CNOT | SWAP |
| --- | --- | --- | --- |
| Fidelity ($F[U], \mathcal{A}$) | 0.9973 | 0.9746 | 0.9276 |
| Diamond norm $\|[U] - \mathcal{A}\|_\diamond$ | 0.0054 | 0.0528 | 0.1472 |

One skilled in the art will recognize that there are generally two variants of performing gate correction using the quasiprobability method. One variant involves finding a QPD of the ideal gate operation (i.e. F=[U] in Equation 1). This variant may be referred to as the 'compensation method'. Another variant involves finding a (generally non-physical) map I such that I°A=[U]. In accordance with this variant, the map I provides an inverse map to the noise. The noisy gate A is executed as-is and the inverse map, simulated using QPD, is implemented right afterwards. This variant may be referred to as the 'inverse method'.

The numerical results of this example demonstration are presented below in Table 3. As shown by Table 3, the compensation method works significantly better when the noisy basis ops A is included in the decomposition set. This makes sense intuitively—the noisy basis op is already a good approximation of [U] and the remaining Endo basis only needs to take care of roughly [U]–A. Because of a similar argument, the inverse method works already well with only the Endo basis.

TABLE 3

|  | C-factor |
| --- | --- |
| Ry gate |  |
| compensation method, Endo basis | 2.9892 |
| compensation method, Endo basis $\cup \{\mathcal{A}\}$ | 1.0106 |
| compensation method, theoretical best from CDD | 1.0000 |
| inverse method, Endo basis | 1.0096 |
| inverse method, Endo basis $\cup \{\mathcal{A}\}$ | 1.0096 |
| inverse method, theoretical best from CDD | 1.0054 |
| CNOT gate |  |
| compensation method, Endo basis | 9.0564 |
| compensation method, Endo basis $\cup \{\mathcal{A}\}$ | 1.1789 |
| compensation method, theoretical best from CDD | 1.0000 |
| inverse method, Endo basis | 1.1935 |
| inverse method, Endo basis $\cup \{\mathcal{A}\}$ | 1.1935 |
| inverse method, theoretical best from CDD | 1.0618 |
| SWAP gate |  |
| compensation method, Endo basis | 34.1381 |
| compensation method, Endo basis $\cup \{\mathcal{A}\}$ | 2.2095 |
| compensation method, theoretical best from CDD | 1.0000 |
| inverse method, Endo basis | 1.4284 |
| inverse method, Endo basis $\cup \{\mathcal{A}\}$ | 1.4284 |
| inverse method, theoretical best from CDD | 1.1779 |

Section 2—Approximate Quasiprobability Decomposition

In some instances, the sampling overhead associated with one or more embodiments of the disclosed quasiprobability method can negatively impact practical realization. For example, some embodiments of the disclosed quasiprobability method can be implemented using relatively shallow circuits in practice due to the exponential scaling of the C-factor in the number of corrected gates.

The following disclosure presents a relaxation of the QPD into a more general form (referred to herein as an approximate QPD) that allows for a certain error in the decomposition, as expressed in Equation 20.

$$\mathcal{F}(\rho) \approx \sum_i a_i \varepsilon_i(\rho) \qquad \text{Equation 20}$$

While implementing an approximate QPD can impact the exactness of the quasiprobability method, the generalization associated with the approximate QPD facilitates finding a better decomposition in terms of the C-factor. In doing so, the approximate QPD significantly reduces the C-factor while only paying with a relatively small error in the decomposition. The approximate QPD therefore represents a tradeoff between the sampling overhead and the error in the quasiprobability method.

Section 2.1—SDP Relaxation using the Diamond Norm

An aspect of implementing an approximate QPD involves a technique for measuring error in the approximate QPD. One candidate for measuring error in an approximate QPD is to use a diamond (i.e., the distance induced by the diamond norm), as it has a strong operational interpretation. Use of a diamond norm for measuring error in an approximate QPD fits very naturally with other aspects of the disclosed optimization techniques, as it has been shown to be expressible as a semidefinite program (SDP), as seen in Equation 21.

Theorem 2.1 (SDP for diamond norm). Let $G \in L(L(A), L(B))$ and denote its Choi matrix representation by $\Lambda_G$. Then $$\|G\|_\diamond = \begin{cases} \max_{\substack{\rho_0, \rho_1 \in L(A) \\ X \in L(BA)}} \frac{1}{2}\langle \Lambda_G, X \rangle + \frac{1}{2}\langle \Lambda_G^*, X^* \rangle \\ \text{s.t.} \quad \begin{pmatrix} \mathbb{1}_y \otimes \rho_0 & X \\ X^* & \mathbb{1}_y \otimes \rho_1 \end{pmatrix} \geq 0, \\ \rho_0 \geq, \rho_1 \geq 0 \\ \rho_0^+ = \rho_0, \rho_1^+ = \rho_1 \end{cases} \qquad \text{Equation 21}$$

The dual formulation of the SDP expressed in Equation 21 is given by $$\begin{cases} \min_{Y_0, Y_1 \in L(BA)} \frac{1}{2}\|Tr_y[Y_0]\|_\infty + \frac{1}{2}\|Tr_y[Y_1]\|_\infty \\ \text{s.t.} \quad \begin{pmatrix} Y_0 & -\Lambda_G \\ -\Lambda_G^* & Y_1 \end{pmatrix} \geq 0, \\ Y_0 \geq 0, Y_1 \geq 0 \end{cases} \qquad \text{Equation 22}$$

In accordance with Equation 22, $\|\cdot\|_\infty$ denotes the spectral norm of a matrix. Consider an instance similar to that discussed above with respect to Section 1.5 involving a fixed decomposition set $\{\varepsilon_i\}$. In this instance, it is desirable to find a best possible approximate QPD of an operation $F \in L(L(A), L(B))$ into that fixed decomposition set. More precisely, a certain limit of the C-factor, denoted $C_{budget}$, is given in this instance such that the QPD may not have a C-factor higher than this limit denoted $C_{budget}$. The optimization problem at hand is thus:

$$\begin{cases} \min_{a_i \in \mathbb{R}} \quad \left\| \mathcal{F} - \sum_i a_i \varepsilon_i \right\|_\diamond \\ \text{s.t.} \quad \sum_i |a_i| \leq C_{budget} \end{cases} \qquad \text{Equation 23}$$

Inserting the SDP from Equation 22 into Equation 23 the optimization problem can be rewritten as:

$$\begin{cases} \min_{a_i \in \mathbb{R}, Y_0, Y_1 \in L(AB)} \frac{1}{2} \|Tr_{\mathcal{H}_\infty}[Y_0]\|_\infty + \frac{1}{2} \|Tr_{\mathcal{H}_\infty}[Y_1]\|_\infty & \text{Equation 24} \\ \text{s.t.} \quad \begin{pmatrix} Y_0 & \sum_i a_i \Lambda_{\mathcal{E}_i} - \Lambda_{\mathcal{F}} \\ \sum_i a_i \Lambda_{\mathcal{E}_i}^* - \Lambda_{\mathcal{F}}^* & Y_1 \end{pmatrix} \geq 0. \\ \sum_i |a_i| \leq C_{budget} \\ Y_0 \geq 0, Y_1 \geq 0 \end{cases}$$

In accordance with Equation 24, $\Lambda_{\mathcal{F}}$, $\Lambda_{\mathcal{E}_i}$ denote the Choi matrices of F, $\mathcal{E}_i$, respectively. To the extent that Equation 24 is still an SDP, Equation 24 facilitates efficiently solving the optimization problem.

Remark 2.2 (Non-physicality of the approximate decomposition). The approximation $F_{approx} := \sum_i a_i \mathcal{E}_i$ of F obtained from the optimization problem in Equation 23 is not guaranteed to be a physical map. In practice, this implies that simulating the execution of a non-physical map can be involved in using the quasiprobability method. It is possible to enforce complete positivity and/or trace-preservingness into the optimization problem:

$$\begin{cases} \min_{a_i \in \mathbb{R}} \|\mathcal{F} - \sum_i a_i \mathcal{E}_i\|_\diamond & \text{Equation 25} \\ \text{s.t.} \sum_i |a_i| \leq C_{budget} \\ \sum_i a_i \mathcal{E}_i \text{ is TPCP} \end{cases}$$

which translates into additional constraints in the SDP of Equation 24:

$$\begin{cases} \min_{a_i \in \mathbb{R}, Y_0, Y_1 \in L(BA)} \frac{1}{2} \|Tr_{\mathcal{H}_m}[Y_0]\|_\infty + \frac{1}{2} \|Tr_{\mathcal{H}_m}[Y_1]\|_\infty & \text{Equation 26} \\ \text{s.t.} \begin{pmatrix} Y_0 & \sum_i a_i \Lambda_{\mathcal{E}_i} - \Lambda_{\mathcal{F}} \\ \sum_i a_i \Lambda_{\mathcal{E}_i}^* - \Lambda_{\mathcal{F}}^* & Y_1 \end{pmatrix} \geq 0 \\ \sum_i |a_i| \leq C_{budget} \\ Y_0 \geq 0, Y_1 \geq 0 \\ \sum_i a_i \Lambda_{\mathcal{E}_i} \geq 0 \\ Tr_{\mathcal{H}_m}\left[\sum_i a_i \Lambda_{\mathcal{E}_i}\right] = \frac{1}{2^*} \mathbb{1}. \end{cases}$$

Adding an additional constraint into the optimization problem can lead to an equal or worse C-factor. Intuitively, this drawback appears insignificant, if the approximation is not excessively coarse, since a good approximation of F is going to be 'almost' a TPCP map. This intuition seems to hold for, at least, the three gates Ry, CNOT and SWAP discussed above, in as much as their respective tradeoff curves remain almost identical under the inclusion of the CP constraint. In some instances, having some complete positivity guarantee on $F_{approx}$ can be useful, as it facilitates using known results and tools from quantum information theory. An example would be the linear propagation of errors (in terms of the diamond norm) throughout the circuit.

Section 2.2—Tradeoff Curves

The following section presents some numerical results associated with an example demonstration of the approximate QPD by visualizing example results of the SDP in Equation 24. More precisely, the example demonstration considered the same three quantum gates (i.e., the Ry, CNOT and SWAP gates) as in Section 1.7 with the same noise model. The example demonstration decomposed the gates using the compensation method into the decomposition set composed of the Endo basis and the respective noisy variant of the gate. The example demonstration solved the SDP in Equation 24 for different values of $C_{budget}$ to obtain a relation $\epsilon(C_{budget})$ between the diamond distance error and the C-factor. This function, which is denoted herein as tradeoff curve, encapsulates the tradeoff between approximation error and sampling overhead that was introduced in the beginning of this chapter. The tradeoff curves for the Ry, CNOT and SWAP gates were numerically obtained using the SDP solver in the MOSEK software package through the CVXPY modelling language.

FIGS. 2A-2C depict the results of the example demonstration. In particular, FIG. 2A illustrates an example, non-limiting graph 200 depicting a tradeoff curve corresponding to an Ry quantum gate (2 arccos $\sqrt{0.56789}$); FIG. 2B illustrates an example, non-limiting graph 210 depicting a tradeoff curve corresponding to a CNOT quantum gate; and FIG. 2C illustrates an example, non-limiting graph 220 depicting a tradeoff curve corresponding to a SWAP gate. In FIGS. 2A-2C, each respective tradeoff curve is plotted as diamond distance error versus C-factor budget and each respective dashed line denotes a diamond distance error of a reference noisy channel (i.e., when the gate is implemented as-is without QEM).

As expected, if the C-factor budget is larger than the optimal C-factor of the non-approximate QPD, which can be found in Table 3, the error becomes zero. Similarly, when the C-factor budget is exactly 1, the error is substantially similar to implementing the gate as-is without QEM. The more interesting regime is in between these two values of $C_{budget}$. As shown by FIGS. 2A-2C, a significant reduction the error of a gate can be realized without having to pay the full C-factor necessary for a non-approximate QPD. For the SWAP gate, the exact QPD requires a C-factor of 2.21 to completely correct the gate. However, if we only pay a C-factor of 1.21, we can still reduce the error by 64%. The saved costs due to the lowered C-factor reqruiement are substantial, since the number of shots scales as $C^{n_{gates}}$, as seen in Section 1.2.

Interestingly the tradeoff curves depicted in FIGS. 2A-2C seem to resemble pairwise linear functions. That is, $\epsilon(C_{budget})$ seems to transition between regimes where the function is roughly linear. This is especially visible for the Ry and CNOT gates. Of note, this is not a result of using a low amount of sampling points, but rather an inherent feature of the curves themselves.

Section 2.3—Application: Optimal Resource Distribution

By applying the approximate quasiprobability method to a circuit with multiple gates, a new degree of freedom emerges that is not present in the original formulation of the quasiprobability method. That new degree of freedom considers how to allocate a C-factor budget for a whole circuit among individual gates comprising the circuit. Stated differently, if a budget $C_{total}$ exists for the whole circuit, how is that budget optimally distributed across the whole circuit? More concretely, given N gates, allocating a C-factor budget $(C_{total})$ for a whole circuit comprising the N gates involves finding individual budgets $C_{budget,i} \geq 0$ for $i=1, \ldots, N$ such that $\Pi_i^N C_{budget,i} = C_{total}$.

At first glance, splitting the budget equally (i.e., $C_{budget,i} = C_{total}^{1/N}$) among the N gates appears to be the optimal solution. However, as demonstrated by an example at the end of the section, this is not the case. Instead, the optimal distribution is a non-trivial optimization problem that is solved numerically.

The following disclosure clarifies what objective function is being optimized in determining an 'optimal' budget distribution. The overall goal is to minimize the error (in terms of the diamond norm) of the total circuit. By denoting $F_{approx,i}$ as the approximate QPD of the i-th quantum gate and $U_i$ the unitary corresponding to the i-th gate, the objective function is therefore:

$$\|F_{approx,N}^o \cdots {}^oF_{approx,2}^oF_{approx,1} - [U_N]^o \cdots {}^o[U_2]^o [U_1]\|^o \quad \text{Equation 27}$$

The computation of this quantity is intractable, as it would involve simulating the complete noisy circuit. Therefore, identifying a proxy that is computable from local quantities can facilitate optimization.

From the triangle inequality and the fact that the diamond norm is a contraction under completely positive maps, the following relationships can be obtained $$\|\varepsilon^o F - \varepsilon'^o F'\|_\diamond \leq \|\varepsilon^o F - \varepsilon'^o F\|_\diamond + \|\varepsilon'^o F - \varepsilon'^o F'\|_\diamond \leq \|\varepsilon - \varepsilon'\|_\diamond + \|F - F'\|_\diamond,$$

for any completely positive maps $\varepsilon$, $F$, $\varepsilon'$, $F'$. Applying this bound to the setting in Equation 27, involves guaranteeing that the $F_{approx,i}$ are completely positive. This can be achieved by inserting an additional constraint into the SDP of the approximate QPD, as described in Remark 2.2. Using the notation $\epsilon_i(C)$ to denote the tradeoff gate of the i-th gate facilitates obtaining the following optimization problem:

$$\begin{cases} \min_{C_{budget,i} \in \mathbb{R}} \sum_i \epsilon_i(C_{budget,i}) & \text{Equation 28} \\ \text{s.t. } C_{budget,i} \geq 0 \, \forall \, i \\ \prod_i C_{budget,i} = C_{global} \end{cases}$$

The optimization problem expressed in Equation 28 is generally non-convex, as insufficient guarantees exist on the shape of the tradeoff curves. Still in practice it can be observed that the objective is convex in a broad region around the optimum, and so numerical heuristics based on gradient descent can be expected to work well.

This section concludes with an example demonstration on a circuit that consists of a Ry quantum gate and a CNOT quantum gate. The tradeoff curves for these quantum gates can be computed exactly as in Section 2.2, with the sole difference being the inclusion of a CP-constraint for the approximate QPD. The example demonstration involved evaluating the tradeoff curves at discrete points and using linear interpolation to extrapolate this data to a full function that can be used in the optimization routine. The example demonstration further involved solving the optimization problem for different values of $C_{total}$ using a black box solver based on the BFGS algorithm implemented in the open-source SciPy software package.

Figure 3:
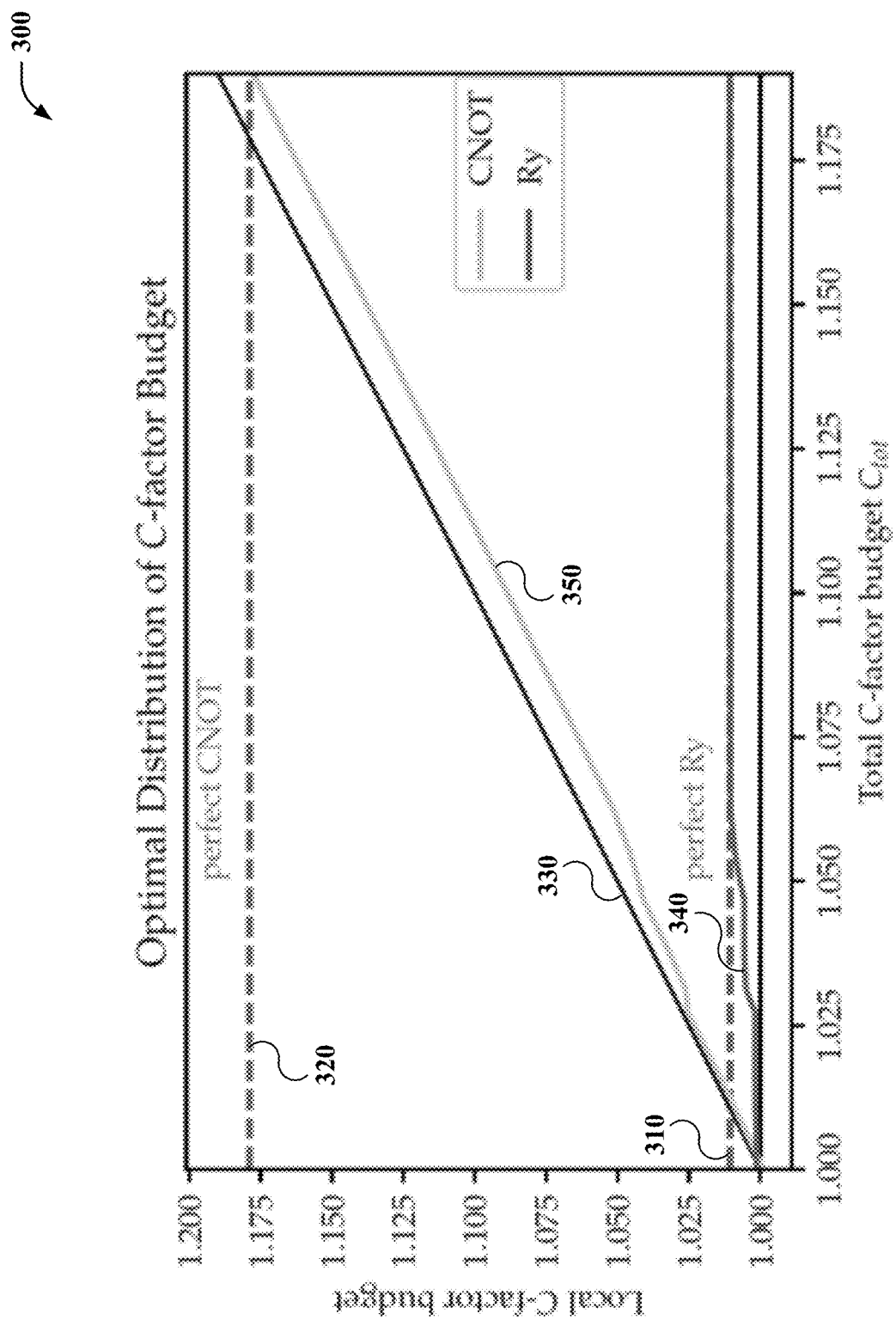
FIG. 3 illustrates an example, non-limiting graph depicting a curve showing an optimal C-factor budget distribution across a circuit comprising a Ry quantum gate and a CNOT quantum gate, in accordance with one or more embodiments described herein.

FIG. 3 depicts the results of the example demonstration. In particular, FIG. 3 illustrates an example, non-limiting graph 300 depicting a curve showing an optimal C-factor budget distribution across a circuit consisting of a Ry quantum gate and a CNOT quantum gate. To obtain example graph 300, the total C-factor budget ($C_{total}$) was varied between 1 and 1.191, which corresponds to a minimal value for concurrently obtaining perfect QPDs for both gates. Dashed lines 310 and 320 denote the C-factor budgets for perfectly decomposing the Ry quantum gate and the CNOT quantum gate, respectively. Line 330 denotes $C_{total}$ that can be obtained by multiplying curves 340 and 350 that correspond to the local C-factor budgets of the Ry quantum gate and the CNOT quantum gate, respectively.

Interestingly, FIG. 3 shows that the optimal strategy for budget distribution is nontrivial. In the regime with a small budget $1 \leq C_{total} \leq 1.025$, it is optimal to give most of the C-factor budget solely to the CNOT gate. In a transition regime $1.025 \leq C_{total} \leq 1.060$ both gates obtain a significant amount of C-factor. In the upper regime $1.060 \leq C_{total}$ the Ry gate is perfectly decomposed, and the remaining budget is then given to the CNOT gate. Accordingly, FIG. 3 shows that a determination of whether to prioritize the CNOT or the Ry gate in budget distribution strongly depends on the value of $C_{total}$.

Section 2.4—Application: Unitary-Only Decomposition

Implementing the quasiprobability method on available quantum hardware can be challenging for various reasons. One such challenge corresponds to a realization that a basis set that is capable of decomposing any unitary operation, such as the Endo basis, involves some operations with measurements and/or resets. For example, out of the 16 basis operations in the Endo basis (See Table 1) only 10 basis operations can be implemented by using purely unitary operations. Also, measurements at intermediate locations within a circuit (i.e., not at the very end) are generally not implemented on current hardware platforms due to such factors as hardware-related constraints. Furthermore, such measurements can generally be plagued by prohibitively high noise. Such measurements also generally involve orders of magnitude more time than unitary gates, which can cause significant decoherence in the surrounding qubits that have to wait for the measurement to finish.

In view of the foregoing, it is questionable as to whether some form of the quasiprobability method could be implemented on a quantum computer only having access to unitary operations. However, the disclosed approximate QPD technique facilitates performing that task. Instead of decomposing a target operation F into the full Endo basis, the disclosed approximate QPD technique facilitates finding the best possible decomposition of F into a decomposition set containing only the unitary operations of the Endo basis (or tensor products thereof).

Figures 4A, 4B, 4C:
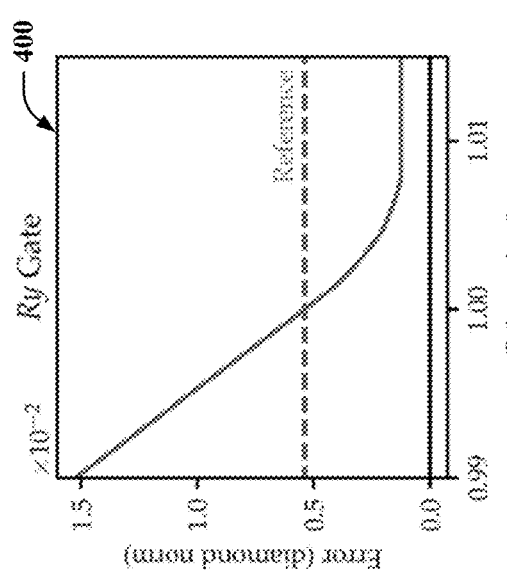
FIGS. 4A-4C illustrate example, non-limiting graphs depicting tradeoff curves obtained using a unitary-only quasiprobability decomposition, in accordance with one or more embodiments described herein.

FIGS. 4A-4C depict example tradeoff curves corresponding to the same three quantum gates (i.e., the Ry, CNOT and SWAP gates) considered in Section 2.2. In particular, FIG. 4A illustrates an example, non-limiting graph 400 depicting a tradeoff curve corresponding to an Ry gate (2 arccos $\sqrt{0.56789}$); FIG. 4B illustrates an example, non-limiting graph 410 depicting a tradeoff curve corresponding to a CNOT gate; and FIG. 4C illustrates an example, non-limiting graph 420 depicting a tradeoff curve corresponding to a SWAP gate. In FIGS. 4A-4C, each respective tradeoff curve is plotted as diamond distance error versus C-factor budget and each respective dashed line denotes a diamond distance error of a reference noisy channel (i.e., when the gate is implemented as-is without QEM).

The example tradeoff curves depicted in FIGS. 4A-4C were obtained using a unitary-only decomposition. One difference between the respective tradeoff curves of FIGS. 2A-2C and FIGS. 4A-4C is that the decomposition set was reduced to only containing the unitary operations in the Endo basis and the respective noisy variant of the gate to obtain the tradeoff curves of FIGS. 4A-4C. That is, to obtain the example tradeoff curves depicted in FIGS. 4A-4C, the decomposition set was restricted to unitary operations, as described above. The compensation method associated with FIGS. 4A-4C involves the decomposition set consisting of tensorproducts of the 10 unitary operations in the Endo basis and the noisy variant of the respective gate. FIGS. 4A-4C show that a significant reduction of the error is achievable with a magnitude of such improvements depending on the specific noise present on the quantum gate.

Figure 5:
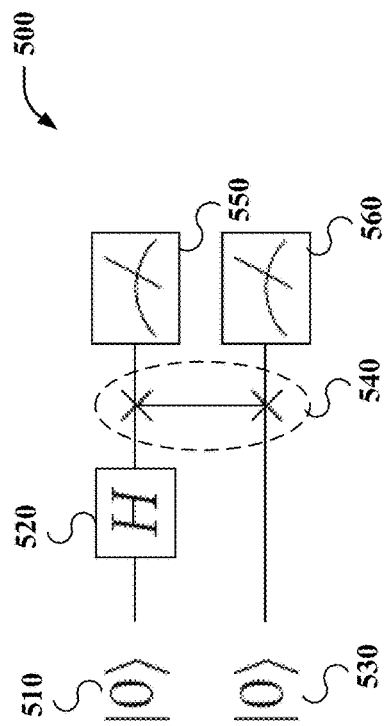
FIG. 5 illustrates a block diagram of an example, non-limiting SWAP gate circuit, in accordance with one or more embodiments described herein.

The last part of this section presents experimental results from an example implementation of the unitary-only approximate quasiprobability method on the IBMQ Singapore quantum chip using Qiskit. The task of the example implementation is to correct the example quantum circuit 500 illustrated in FIG. 5. As shown by FIG. 5, example quantum circuit includes first qubit 510 that provides input to Hadamard gate 520 and second qubit 530 that provides input to SWAP gate 540 along with the output of Hadamard gate 520. Measurement operations 550 and 560 are performed on outputs of SWAP gate 540.

Since the noise of two-qubit gates is significantly higher compared to single-qubit gates, the example implementation only corrects the SWAP gate 540 with the quasiprobability method. The example implementation performs an approximate QPD as in Equation 20 where the 101-element decomposition set $\{\varepsilon_i\}$ consists of 10·10 unitary Endo operations and the noisy SWAP gate A. Since the Endo operations consist of tensor products of single-qubit unitary gates, an assumption can be made that the Endo operations are ideal in a first order approximation. Therefore, the example implementation only performs tomography of the channel A. This can be done using process tomography, which entails the execution of 144 different quantum circuits which are each executed with 8192 shots. In a second step, the example implementation performs the approximate QPD $[U] \approx \Sigma_i \alpha_i \varepsilon_i$. Next, the example implementation generates 101 circuits that each correspond to the example circuit 500 with SWAP gate 540 being replaced by an element $\varepsilon_i$ of the decomposition set. Each of these 101 circuits are executed on the hardware with 8192 shots, resulting in an estimate $\hat{\rho}_i$ of the distribution of the measurement outcomes of the respective circuit. Denote by p the distribution of the measurement outcome of the ideal circuit which contains an ideal SWAP gate. To evaluate the improvement caused by the quasiprobability method, the example implementation considers the $L_1$-norm between $\rho$ and $\Sigma_i \alpha_i \hat{\rho}_i$. Of note, the latter is generally not a real distribution, since $\Sigma_i \alpha_i \varepsilon_i$ does not have to be TP or CP. As such, this distance can be viewed as an $L_1$-norm between arbitrary vectors. The example implementation correcting single SWAP gate 540 on first qubit 510 and second qubit 530 using a unitary-only approximate QPD was repeated 5 times and the results are reported below in Table 4. On average the error of the statistics is reduced by 23%, as shown by Table 4.

TABLE 4

|  | $L_1$ error without mitigation | $L_1$ error with mitigation |
| --- | --- | --- |
| Run 1 | 0.053 | 0.034 |
| Run 2 | 0.056 | 0.043 |
| Run 3 | 0.058 | 0.049 |
| Run 4 | 0.061 | 0.043 |
| Run 5 | 0.066 | 0.056 |
| Mean | 0.058 | 0.045 |
| Stdev | 0.005 | 0.008 |

An additional example implementation was performed that is substantially similar to the example implementation discussed above with respect to Table 4. However, the additional example implementation replaced first qubit 510 and second qubit 520 with qubits exhibiting worse 2-qubit gate fidelities. The results of the additional example implementation are depicted below in Table 5. On average the error of the statistics is reduced by 34%, as shown by Table 5.

TABLE 5

|  | $L_1$ error without mitigation | $L_1$ error with mitigation |
| --- | --- | --- |
| Run 1 | 0.261 | 0.167 |
| Run 2 | 0.298 | 0.205 |
| Mean | 0.279 | 0.186 |
| Stdev | 0.026 | 0.026 |

Section 3—Stinespring Algorithm

The foregoing disclosure has introduced two variants on how to obtain an optimal QPD. The first variant provides that if the decomposition set is fixed in advance, an optimal QPD can be found by a simple linear program (See Section 1.5). The second variant provides that by also optimizing over the decomposition set, an optimal QPD is given by the CDD (See Section 1.6). Unfortunately, the result of the CDD is not directly applicable to the quasiprobability method, as an arbitrary ideal quantum channel generally cannot be implemented. Therefore, a technique is needed that is both capable of: (i) finding a decomposition basis that can perform better than the Endo basis; (ii) being implemented on available quantum computers. Such technique must also take into account the noise of a specific quantum computer, such that it can adapt the decomposition basis accordingly.

Any number of issues can present challenges in identifying a technique with such capabilities. For example, it can be difficult to optimize over the space of all possible operations that are implementable by a given quantum device. In general, this space is extremely large and may vary significantly from one quantum device to another. As another example, performing tomography to characterize the operations $\varepsilon_i$ is very expensive. We want to limit the number of required uses of tomography as much as possible.

In this chapter, a technique is introduced with the capabilities discussed above while being capable of dealing with both challenging issues identified above. That technique is referred to herein as the Stinespring algorithm. One aspect of the Stinespring algorithm that addresses the first challenging issue involves constructing a decompiosition set from a very limited class of operations of a very specific form that can be implemented on available quantum computers. More precisely, the Stinespring algorithm considers operations that simulate a quantum channel using a Stinespring dilation.

The Stinespring algorithm that can produce a decomposition set that exhibits significantly reduced C-factors relative to the Endo basis. Another between the Stinespring algorithm and using the Endo basis is that the Stinespring algorithm does not perform measurements on the computational qubits. Instead, the Stinespring algorithm performs resets on ancilla qubits that are used for the dilation. Such use of additional ancilla qubits does not occur when using the Endo basis. Before presenting the full Stinespring algorithm in Section 4.3, the following disclosure will introduce some essential building blocks which will prove useful later.

Section 3.1—Stinespring Dilation on a Quantum Computer

The Stinespring dilation is a central theorem in quantum information theory. The Stinespring dilation states that any physical quantum channel can mathematically be expressed as a unitary evolution on some extended Hilbert space, where the quantum information stored in the extension is inaccessible.

Theorem 3.1 (Stinespring dilation) Consider $\varepsilon \in \text{TPCP}(A)$. There exists a Hilbert space $H_R$ and an isometry $V_{St} \in L(A, BR)$ such that:

$$\forall \rho \in S(A): \varepsilon(\rho) Tr_R[V_{St} \beta V_{St}^\dagger] \quad \text{Equation 29}$$

Furthermore, a Stinespring dilation exists with $\dim(R) \leq r$ where r is the rank of the quantum channel defined by $r := \text{rank}(\Lambda)$ for $\Lambda$ the Choi matrix of $\varepsilon$. Any isometry $V_{St}$ can be extended (generally non-uniquely) to a unitary $U_{St} \in U(AR, BR)$ such that $U_{St}$ acts equivalently to $V_{St}$ on the space of states of the form $\rho_A \otimes 00_R$ for some arbitrarily chosen state $0_R$.

Figure 6:
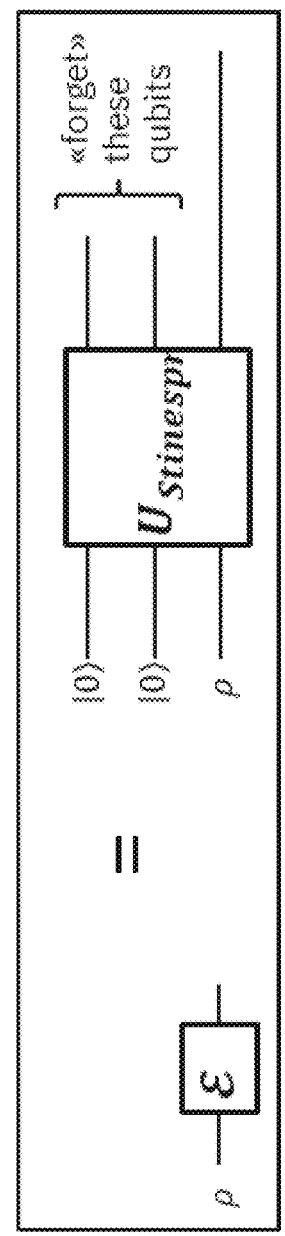
FIG. 6 illustrates an example, non-limiting high-level conceptual overview of using a Stinespring dilation to approximate a quantum channel on quantum hardware, in accordance with one or more embodiments described herein.

FIG. 6 illustrates an example conceptual overview of using a Stinespring dilation to approximate any quantum channel on a quantum computer. As illustrated by FIG. 6, the Stinespring dilation can be used to approximate an arbitrary quantum channel on a quantum computer by making use of clean ancilla qubits, performing a circuit corresponding to the unitary $U_{St}$ on the extended space, and finally discarding the ancilla qubits. However, a noisy quantum computer cannot be expected to implement $U_{St}$ accurately, and so the resulting channel will be an approximation of a target channel. Available quantum hardware generally struggles to produce high-fidelity two-qubit gates, so the approximation will be generally poor if the circuit implementation of $U_{St}$ involves an excessive number of multi-qubit gates.

For simplicity, the following disclosure will assume that the CNOT gate is the only multi-qubit gate that available quantum hardware platforms can implement, and that all other multi-qubit gates must be decomposed into CNOT gates and single-qubit gates. Accordingly, the number of CNOT gates can often be a good indicator for the amount of noise accumulated by a quantum circuit. The number of required CNOT gates to implement $U_{St}$ is generally related to the number of qubits involved in the unitary, and so it can be desirable to keep the rank r as small as possible ($\tau=1$ requires no ancilla qubits, r=2 requires one ancilla qubit, r=3,4 requires two ancilla qubits, etc . . . ).

In practice, 1-qubit and 2-qubit channels of rank ≤2, can be considered such that the Stinespring dilation can be implemented with, at most, a 3-qubit unitary. In some implementations, a 3-qubit unitary corresponds can an upper limit where the channel still gets reasonably approximated with available quantum hardware. The following subsection introduces a technique that can further improve channel approximation via a Stinespring dilation.

Section 3.1.1—Variational Unitary Approximation

Two observations can be used to optimize the approximation of a quantum channel through the Stinespring dilation. A first observation is that there is some additional degree of freedom that can be used to further optimize the approximation of a quantum channel. The choice of the unitary $U_{St}$ extending the isometry $V_{St}$ is not unique. A $U_{St}$ can be selected that exhibits the smallest possible error caused by hardware noise. A second observation is that since the quantum hardware is noisy, it might not be advantageous to implement a circuit that represents $U_{St}$ exactly. Instead, it can make more sense to implement a circuit that approximates $U_{St}$ with a finite error and requires fewer CNOT gates, and thus suffers less noise from the quantum hardware. As such, a tradeoff exists between approximation error and error stemming from hardware noise.

This section proposes a technique that makes use of both observations discussed above and will be referred to herein as variational unitary approximation. Variational unitary approximation involves using a variational circuit to implement the dilation and fits its parameters in order to approximate $V_{St}$ as well as possible. The following disclosure denotes by $\theta$ the tuple of all variational parameters and $U_{Var}(\theta)$ the unitary represented by the variational form. Furthermore, the following disclosure denotes by $V(U_{Var}(\theta))$ the submatrix of $U_{Var}(\theta)$ restricted on the subspace where the ancilla qubits are fixed to the zero state. It is desirable to choose $\theta$ parameters such that a difference between $V(U_{Var}(\theta))$ and $V_{St}$ is minimized.

Variational unitary approximation facilitates freely selecting the expressiveness of a variational circuit. More concretely, variational unitary approximation facilitates tuning a number of CNOT gates that a variation circuit contains, and therefore influences the tradeoff between approximation error and hardware noise error.

The following disclosure provides an example implementation that illustrates the gains from the variational unitary approximation. Consider an arbitrary 2-qubit rank 1 quantum channel for approximation with a Stinespring dilation. The exact representation of a general 3-qubit unitary as a quantum circuit generally requires around 100 CNOT gates (assuming linear connectivity), which can exceed the capabilities of available quantum hardware. The example implementation replaced this ideal quantum circuit representing a general 3-qubit unitary with an example RYRZ variational circuit 700 illustrated in FIG. 7.

Figures 7, 8A, 8B:
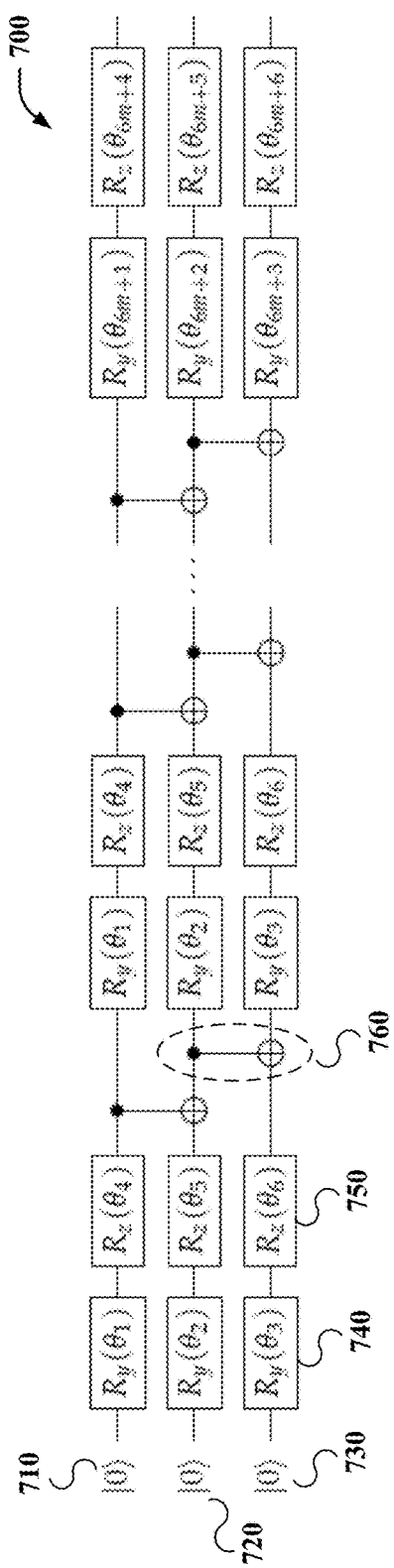
FIG. 7 illustrates a block diagram of an example, non-limiting RYRZ variational circuit, in accordance with one or more embodiments described herein.
FIGS. 8A-8B illustrate example, non-limiting graphs depicting error corresponding to variational unitary approximation on a haar-random 3-qubit unitary using a RYRZ variational form, in accordance with one or more embodiments described herein.

As illustrated by FIG. 7, circuit 700 includes: three qubits (qubits 710, 720, and 730); a number of y-rotation sub-circuits, such as y-rotation sub-circuit 740; a number of z-rotation sub-circuits, such as z-rotation sub-circuit 750; and a number of CNOT gates, such as CNOT gate 760. In FIG. 7, m denotes the depth of the variational form, the total number of parameters is 6(m+1) and the the total number of CNOT gates is 2m. The example implementation used the gradient-based BFGS algorithm implemented in the open-source SciPy package to minimize the objective function $\|V_{St} - V(U_{Var}(\theta))\|_2$. To avoid estimating the gradient with the finite differences method, the example implementation used the Autograd package for automatic differentiation. As initial guess for the $\theta$ parameters, the example implementation used uniformly random numbers. The objective function is non-convex and in practice the optimization algorithm finds a different local minimum depending on the initial point. It was observed from the example implementation that good results can be obtained in practice by repeating the optimization process 5 times for different initial values and then taking the best result.

The above procedure is repeated for different depths of the variational form on a haar-random 3-qubit unitary $U_{St}$. By using a noise model from Qiskit, extracted from the IBMQ Melbourne hardware backend, an estimation can be obtained that characterizes how well the variational unitary approximation technique approximates the 2-qubit quantum channel $\rho \to Tr_3[U_{St} \rho U_{St}^\dagger]$ where $Tr_3$ stands for tracing out the third qubit. More precisely, a diamond norm error can be computed between the obtained 2-qubit quantum channel and the ideal 2-qubit quantum channel. The diamond norm error encapsulates the approximation error of the variational form combined with the hardware noise.

FIGS. 8A-8B depict the results of the example implementation discussed above. In particular, FIG. 8A illustrates an example, non-limiting graph 800 depicting a curve showing diamond norm error of the dilated quantum channel for different depths of the variational form. The dashed line in FIG. 8A corresponds to error that would be obtained if $U_{St}$ were naively decomposed in a quantum circuit without the optimizations provided by variational unitary approximation. FIG. 8B illustrates an example, non-limiting graph 850 depicting a curve showing approximation error $\|V_{St} - V(U_{Var}(\theta))\|_2$ of the dilated quantum channel for different depths of the variational form. As such, the curve depicted by graph 850 can be regarded as the analogue of the curve depicted by graph 800 without the effect of hardware noise.

FIGS. 8A-8B show that the variational unitary approximation technique facilitates significantly reducing error associated with decomposing $U_{St}$ to roughly one quarter of its reference value. FIGS. 8A-8B further show that there is a sweet spot in variational circuit depth. This makes sense intuitively when considering the tradeoff mentioned above. In particular, if the variational circuit depth is too short, then $U_{St}$ is not well approximated. Alternatively, if the variational circuit depth is too long, then the hardware noise takes over and samples mostly comprise noise. With respect to the example implementation, the optimum is reached at a variational circuit depth of 6, as shown by FIGS. 8A-8B. Furthermore, FIG. 8B shows that the approximation error is approximately zero as soon as the variational circuit depth is at least 7. The example implementation results support a conclusion that the approximation error can be significantly more relevant than the hardware noise.

Section 3.2—Rank-Constrained Channel Decomposition

Consider some $F \in TP(A)$. Remember that the CCD (See Section 1.6) asserts that $\varepsilon^+, \varepsilon^- \in TPCP(A)$, $\alpha^+, \alpha^- \geq 0$ can be found such that $F = \alpha^+ \varepsilon^+ - \alpha^- \varepsilon^-$ with optimal C-factor $\alpha^+ + \alpha^-$. For the sake of the Stinespring algorithm, it can be desirable to approximate the $\varepsilon^\pm$ using a Stinespring dilation, as explained in Section 3.1. In some instances, approximating the $\varepsilon^\pm$ using a Stinespring dilation works reasonably well when the number of ancilla qubits does not exceed a defined threshold. We can enforce this defined threshold by adding an additional constraint $\text{rank}(\Lambda_{\varepsilon_i}^\pm) \leq r$ for some $r \in \mathbb{N}^{\geq 1}$ into Equation 15:

$$\begin{cases} \min_{\alpha_i^\pm \in \mathbb{R}^+, \tilde{\Lambda}_{\varepsilon_i}^\pm \in \mathbb{C}^{4^n \times 4^n}} \sum_{i=1}^{2^{5n}} |a_i| \\ \text{s.t. } \Lambda_{\mathcal{F}} = \sum_{i=1}^{n_{pos}} \tilde{\Lambda}_{\varepsilon_i}^+ - \sum_{i=1}^{n_{neg}} \tilde{\Lambda}_{\varepsilon_i}^- \\ \tilde{\Lambda}_{\varepsilon_i}^\pm \geq 0 \\ Tr_2[\tilde{\Lambda}_{\varepsilon_i}^\pm] = \frac{1}{2^n}\mathbb{1} \\ \text{rank}(\tilde{\Lambda}_{\varepsilon_i}^\pm) \leq r. \end{cases} \quad \text{Equation 30}$$

By $n_{pos}$, $n_{neg}$, Equation 30 denotes the number of quantum channels obtained from decomposition. Of note, this additional rank constraint removes any guarantee that F can be decomposed into just two channels. The introduction of such rank constraints generally turns a SDP into a NP-hard problem. Therefore, heuristics can be used to find a solution when such rank constraints are introduced. One common heuristic for rank constrained SDPs is to minimize the nuclear norm instead of bounding the rank, as it constitutes the convex envelope of the rank. Unfortunately, that heuristic is incompatible with embodiments of the disclosed quasiprobability method, as the trace of the Choi matrices is already fixed.

Instead, the Burer Monteiro approach can be used for low-rank solution of SDPs. Suppose that we want to solve a given SDP with a rank constraint $\text{rank}(C) \leq r$ for some positive-semidefinite n×n matrix C. One aspect of solving the given SDP is to parametrize $C = X^\dagger \cdot X$ for some r×n complex matrix X and then optimize over the matrix elements of X. The positive-semidefiniteness and rank constraint of C are automatically enforced from the construction. Unfortunately, the objective function and the constraints generally contain quadratic terms of X, and so the problem becomes a quadratically-constrained quadratic problem. Still, it has been demonstrated that the objective landscape of such problems tends to behave nicely, and that using local optimization methods can provably lead to the global optimum under some assumptions.

In this instance, the $\Lambda_{\varepsilon_i}^\pm$ does not appear in the objective function, and so the problem actually becomes a quadratically-constrained linear problem, or a problem of the form expressed by Equation 31.

$$\begin{cases} \min_x f(x) \\ \text{s.t. } g(x) = 0 \end{cases} \quad \text{Equation 31}$$

In Equation 31, when all variables are grouped into a large vector x, f is a linear function and g is a quadratic function. The optimum f* of the objective function can be determined without the rank constraint. One assumption that can facilitate using local optimization methods to provably lead to a global optimum includes:

Assumption 3.2 The rank-constrained optimization problem in Equation 30 reaches the same minimal C-factor as the original SDP in Equation 15.

This assumption does not hold for r=1, as it would imply that any $F \in TP(A)$ can be decomposed into unitary operations. The following disclosure will assume that Assumption 3.2 does hold for instances where $r \geq 2$. Assumption 4.2 facilitates reformulating Equation 31 as:

$$\begin{cases} \min_x \|g(x)\|_2 \\ \text{s.t. } f(x) = f^* \end{cases} \quad \text{Equation 32}$$

In some instances, this optimization is successful when it finds a solution of Equation 32 which minimizes $\|g(x)\|_2$ to zero. One reason for switching around of objective and constraint involves the tendency of linear constraints to be easier to deal with numerically.

To practically solve Equation 32, a trust-region algorithm for constrained optimization can be used, which is included in SciPy. In practically solving Equation 32, r can be fixed to r=2, which corresponds to allowing at most one ancilla qubit in the Stinespring dilation. In the single-qubit case a good solution can consistently be found, whereas in the two-qubit case convergence problems can often be confronted. It is not exactly clear whether these convergence problems stem from the non-existence of a low-rank solution (i.e., Assumption 4.2 is wrong) or from numerical issues with the Burer Monteiro method. In either case, it was observed that the convergence could be significantly improved by allowing some error in the linear constraint:

$$\begin{cases} \min_x \|g(x)\|_2 \\ \text{s.t. } f^* \leq f(x) \leq f^* \cdot \varepsilon \end{cases} \quad \text{Equation 33}$$

In some instances, a value of $\varepsilon = 1.2$ can be used in Equation 33. Using that value of $\varepsilon$ allows for a sub-optimality in the C-factor by at most 20%. In other instances, a smallest admissible $\varepsilon$ can be found using bisection. With regards to $n_{pos}$ and $n_{neg}$, $n_{pos} = n_{neg} = 2$ can be used for single-qubit quantum channels and $n_{pos}=n_{neg}=8$ can be used for two-qubit quantum channels.

Section 3.3—Initialization for Rank-Constraint Channel Decomposition

It was observed that a good initialization of x for Equation 32 can be of major importance. The following section details the procedure for this initialization of x for Equation 32. To that end, this section endeavors to solve following optimization problem:

$$\begin{cases} \min_{a_i^{\pm} \in \mathbb{R}^+, X_i^{\pm} \in \mathbb{C}^{2 \times 4^n}} \left\| \Lambda_{\mathcal{F}} - \left( \sum_{i=1}^{n_{pos}} \tilde{\Lambda}_{\mathcal{E}_i}^+ - \sum_{i=1}^{n_{neg}} \tilde{\Lambda}_{\mathcal{E}_i}^- \right) \right\|_2^2 + \\ \sum_{1}^{n_{pos}} \left\| Tr_2[\tilde{\Lambda}_{\mathcal{E}_i}^+] - \frac{1}{2^n}\mathbb{1} \right\|_2^2 + \sum_{i=1}^{n_{neg}} \left\| Tr_2[\tilde{\Lambda}_{\mathcal{E}_i}^-] - \frac{1}{2^n}\mathbb{1} \right\|_2^2 \\ \text{s.t. } f^* \leq \sum_{i=1}^{n_{pos}} a_i^+ + \sum_{i=1}^{n_{neg}} a_i^- \leq f^* \cdot \varepsilon \\ \tilde{\Lambda}_{\mathcal{E}_i}^{\pm} = (X_i^{\pm})^+ \cdot X_i^{\pm}. \end{cases}$$

Equation 34

In solving the optimization problem of Equation 34, this restricts r to the case of r=2, which corresponds to allowing a single ancilla qubit in the Stinespring dilation. In order to solve this problem with a local method, an initial guess $\alpha_i^{\pm,0}$, $X_i^{\pm,0}$ for the parameters can be used. The following disclosure presents a heuristic to find such initial values. The heuristic starts off by computing the CDD $F=\alpha^+\varepsilon^+-\alpha^-\varepsilon^-$ of the target operation. To that end, the spectral decomposition of the Choi matrices of $\varepsilon^{\pm}$ are considered, as expressed by Equations 35 and 36.

$$\Lambda_{\mathcal{E}^{\pm}} = \begin{pmatrix} | & & | \\ u_1^{\pm} & \cdots & u_{4^n}^{\pm} \\ | & & | \end{pmatrix} \cdot \text{diag}(\lambda_1, \ldots, \lambda_{4^n}) \cdot \begin{pmatrix} - & (u_1^{\pm})^{\dagger} & - \\ & \vdots & \\ - & (u_{4^n}^{\pm})^{\dagger} & - \end{pmatrix}$$

Equation 35

$$= \sum_{i=1}^{4^n} \lambda_i u_i^{\pm} \cdot (u_i^{\pm})^{\dagger}$$

Equation 36

In Equation 36, $\lambda_i^{\pm}$ denotes the eigenvalues and $u_i^{\pm}$ denotes the corresponding eigenvectors. The indices can be chosen such that the $\lambda_i^{\pm}$ are ordered decreasingly in i. Equation 36 is a decomposition of $\varepsilon^{\pm}$ into rank-1 operations. Since this section strives to find a decomposition into rank-2 operations, the rank-1 matrices of Equation 36 can be grouped into pairs as follows:

$$\Lambda_{\mathcal{E}^{\pm}} = \sum_{i=1}^{4^n/2} Y_i^{\pm} \cdot (Y_i^{\pm})^{\dagger} \text{ where}$$

Equation 37

$$Y_i = \begin{pmatrix} | & | \\ \sqrt{\lambda_{2i}} u_{2i}^{\pm} & \sqrt{\lambda_{2i+1}} u_{2i+1}^{\pm} \\ | & | \end{pmatrix}$$

Equation 38

An initial guess can be expressed as:

$$a_i^{\pm,0} := Tr[Y_i] \text{ and } X_i^{\pm,0} := \frac{Y_i}{Tr[Y_i]}$$

Equation 39

If $n_{pos}=n_{neg}<\frac{1}{2} 4^n$ this implies that only the $2n_{pos}$ largest eigenvalues are considered while the remaining eigenvalues are discarded. As mentioned in Section 3.2, when dealing with two-qubit gates n=2, $n_{pos}=8$ can be selected. This way:

$$\Lambda_{\mathcal{F}} = \left( \sum_{i=1}^{n_{pos}} \tilde{\Lambda}_{\mathcal{E}_i}^+ - \sum_{i=1}^{n_{neg}} \tilde{\Lambda}_{\mathcal{E}_i}^- \right)$$

Equation 40

By selecting $n_{pos}=8$, the initial guess already fulfills Equation 40. Furthermore, the initial guess also already fulfills the C-factor of Equation 41. Therefore the only condition that is not yet fulfilled is the trace-preservingness of the $\tilde{\Lambda}_{\mathcal{E}_i}^{\pm}$.

$$f^* = \sum_{i=1}^{n_{pos}} a_i^+ + \sum_{i=1}^{n_{neg}} a_i^-$$

Equation 41

Section 3.4—Overview of the Stinespring Algorithm

The result in Section 3.2 facilitates decomposing any $F \in TP(A)$ into rank r quantum channels. Using the result from Section 3.1 these quantum channels can be approximated by using $\log_2 r$ ancilla qubits. Choosing a small enough value for r ensures that corresponding approximation is sufficiently accurate.

Still, there is an important step missing before this result can be practically used. The quasiprobability method utilizes a QPD (See Equation 1) where the $\varepsilon_i$ are quantum channels describing the hardware (i.e., extracted using tomography). However, the Stinespring dilation generally yields approximations of such QPDs, not real ones. Some instances involve accounting for this inaccuracy of the Stinespring dilation when constructing a QPD. This can be achieved using an iterative algorithm.

Assume that a noise oracle $\varepsilon \rightarrow N(\varepsilon)$ is accessible that provides information concerning the accuracy of how well a quantum channel $\varepsilon$ is approximated using the Stinespring dilation. In general, this oracle can be implemented with some form of tomography, and so it will be assumed that calling this oracle is very expensive. Assume that the decomposition defined by Equation 34 was found using the rank-constrained optimization.

$$\mathcal{F} = \sum_{i=1}^{n_{pos}} a_i^+ \mathcal{E}_i^+ + \sum_{i=1}^{n_{neg}} a_i^- \mathcal{E}_i^-$$

Equation 42

If F were implemented with the quasiprobability method using the Stinespring approximation of the involved channels $\varepsilon_i^{\pm}$, an error $\delta$ would occur where:

$$\delta := \mathcal{F} - \sum_{i=1}^{n_{pos}} a_i^+ N(\mathcal{E}_i^+) - \sum_{i=1}^{n_{neg}} a_i^- N(\mathcal{E}_i^-)$$

Equation 43

This procedure can be iteratively repeated, but this time decomposing S instead of F. During each point of the iteration, the $N(\varepsilon_i^{\pm})$ can be stored into the decomposition set. At some point, the decomposition set will be large enough such that the error of the total approximation error is smaller than a desired threshold. A conceptual visualization of an example iterative process involved in using the Stinespring algorithm is depicted in FIG. 9 and an example of the Stinespring algorithm can be found in Algorithm 1.

Figure 9:
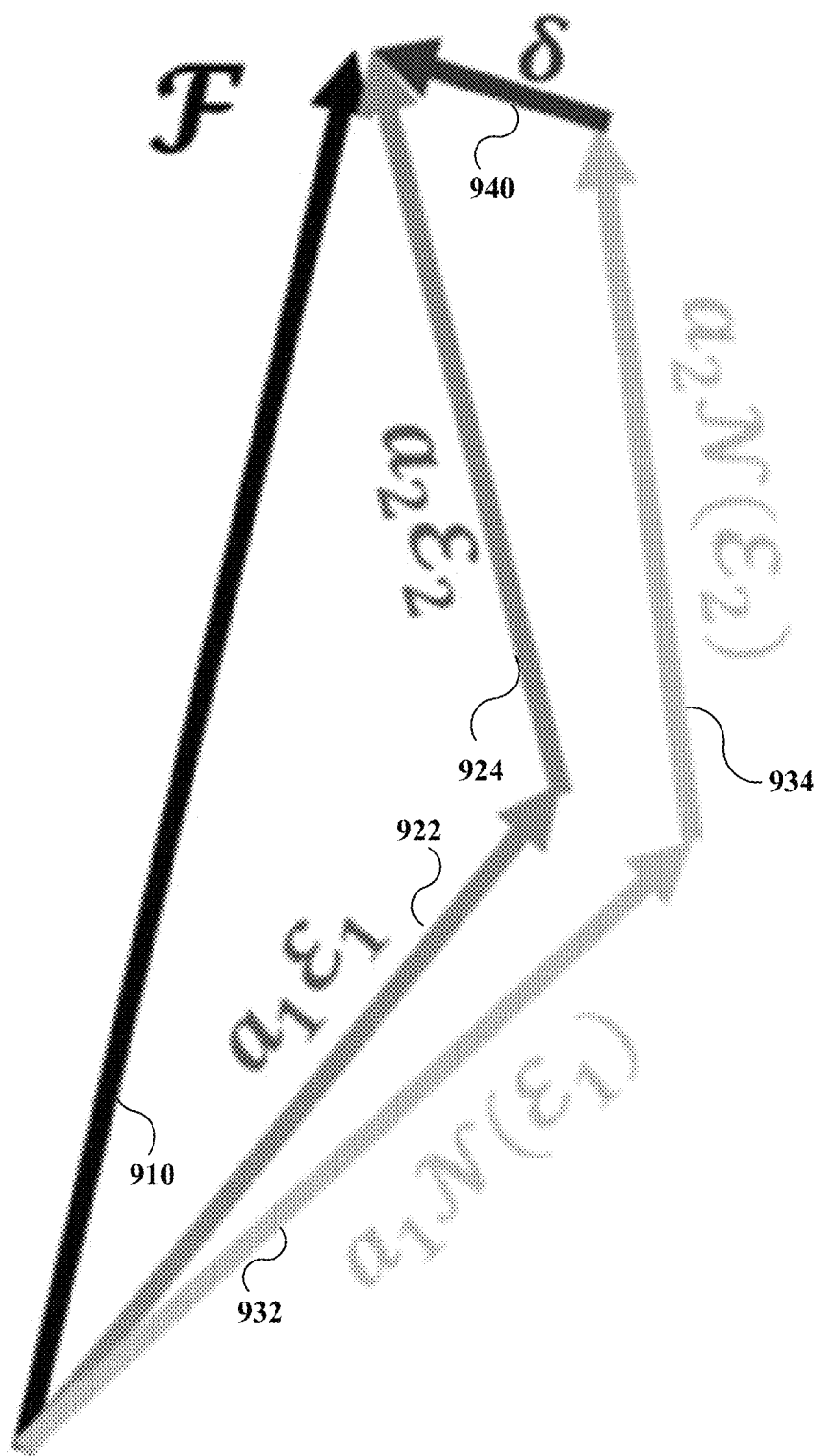
FIG. 9 illustrates an example, non-limiting visualization of an iterative process involved in using a Stinespring algorithm to identify a decomposition basis, in accordance with one or more embodiments described herein.

With reference to FIG. 9, a first step of the example iterative process includes optimally decomposing a target operation F 910 into a set of desired quantum channels $\varepsilon_i$ (e.g., desired quantum channels 922 and 924) of rank≤r. A second step of the example iterative process includes generating a set of approximation quantum channels (e.g., approximation quantum channels 932 and 934) that approximate the set of desired quantum channels $\varepsilon_i$ using a Stinespring dilation and a noise oracle that provides information indicative of error caused by hardware noise. A third step of the example iterative process includes determining an error δ 940 that is indicative of a total approximation error between the set of desired quantum channels and the set of approximation quantum channels. The example iterative process then repeats the first step using error δ 940 as the target operation instead of target operation F 910. The example iterative process terminates when the total approximation error falls below a threshold value.

As discussed in greater detail below with respect to Section 3.4, various improvements can be realized through using the Stinespring algorithm to obtain an optimal QPD rather than using the Endo basis. For example, the Stinespring algorithm produces a significantly smaller decomposition basis to span the complete space of Hermitian-preserving operators than that produced using the Endo basis. As another example, the C-factors obtained using a decomposition basis produced by the Stinespring algorithm can be substantially lower than those obtained using the Endo basis. Realizing such improvements involves the Stinespring dilation providing relatively accurate approximations of desired quantum channels. Stated differently with respect to FIG. 9, realizing such improvements involves the set of approximation quantum channels (e.g., approximation quantum channels 932 and 934) being substantially similar to the set of desired quantum channels (e.g., desired quantum channels 922 and 924). One aspect of the present disclosure that facilitates obtaining relatively accurate approximations of desired quantum channels using the Stinespring dilation is the inclusion of the rank constraint discussed above. In some embodiments, the variational unitary approximation technique can facilitate further improvement. In an embodiment, variational unitary approximation can be used to implement the Stinespring dilation.

In an embodiment, the Stinespring algorithm facilitates finding a hardware noise-adapted quasiprobability decomposition that facilitates a reduction in sampling overhead. In an embodiment, the Stinespring algorithm facilitates finding a non-approximated quasiprobability decomposition. In an embodiment, an optimal decomposition can be found without setting a budget value ($C_{budget}$) for a C-factor that is a metric for increase in variance of quasi-probability sampling when the Stinespring algorithm is utilized to find the optimal decomposition.

---
Algorithm 1
Algorithm 1: Stinespring Algorithm
---

Given: a target unitary operation $[U]$ for $U \in U(A)$, a noise oracle
$\mathcal{N}$, a threshold $dn_{threshold}$ for the dimaond norm error;
Result: Decomposition set $\mathcal{D}$ and set of Stinespring dilation circuits
$\mathcal{C}$
$\mathcal{C} := \{\text{circuit of } U\}$;
$\mathcal{D} := \mathcal{N}([U])$;
$\mathcal{F} := [U]$;
while True do
    aqpd := perform approximate QPD of $\mathcal{F}$ using decomposition
    set $\mathcal{D}$;

---
-continued

Algorithm 1
Algorithm 1: Stinespring Algorithm
--- dn := get diamond norm error of approximate QPD aqpd;
    if dn < $dn_{threshold}$ then
        | break;
    end
    δ := get the remaining error of the approximate qpd aqpd;
    channels := perform rank-constrained channel decomposition of
        δ into a set of channels;
    StIsos = get Stinespring dilation isometries of the channels
        channels;
    circuits = get variational unitary approximation circuits of the
        isometries StIsos;
    $ops_{noisy}$ = apply noise oracle on the circuits in circuits;
    $\mathcal{C} = \mathcal{C} \cup \text{circuits}$;
    $\mathcal{D} = \mathcal{D} \cup ops_{noisy}$;
end Remark 4.3 (Compensation method vs inverse method) Algorithm 1 is formulated analogously to the compensation method, in the sense that the ideal unitary operation $[U]$ is decomposed into a basis set containing the noisy variant thereof. It would also be possible to implement the inverse method instead by choosing the initial F to be the inverse map of the noise instead of $[U]$. But for the sake of simplicity, the rest of this chapter will be restricted to the compensation method.

Remark 4.4 (Noise oracle) If a good noise model of the hardware is available, it can be advantageous to use that implement the noise oracle involved in the Stinespring algorithm. That way, tomography does not have to be iteratively performed in each step of the Stinespring algorithm. Instead, a suitable decomposition basis can be determined using the noise model and the Stinespring algorithm. Tomography of the elements could be performed on the suitable decomposition basis at the very end.

Section 3.4—Simulation Results

This section presents results associated with an example demonstration that utilizes the Stinespring algorithm with the single- and two-qubit gates Ry, CNOT and SWAP, which were analyzed above in Section 1.7. For all three gates, a rank-constraint of r=2 can be enforced during the channel decomposition. This corresponds to allowing for at most one ancilla qubit during the Stinespring dilation. For the two-qubit gates, the example demonstration used variational unitary approximation with a RYRZ variational form of depth 6. The noise oracle is based on a noise model obtained from Qiskit, which aims to approximate the noise on the IBMQ Melbourne hardware platform. Using a noise model instead of a full tomography significantly speeds up the example demonstration. The example demonstration used a threshold of $dn_{threshold}=10^{-7}$ to stop the iterative procedure. At each iteration of the Stinespring algorithm, the diamond norm error of the current approximate QPD (denoted dn in Algorithm 1) is stored.

Figure 10:
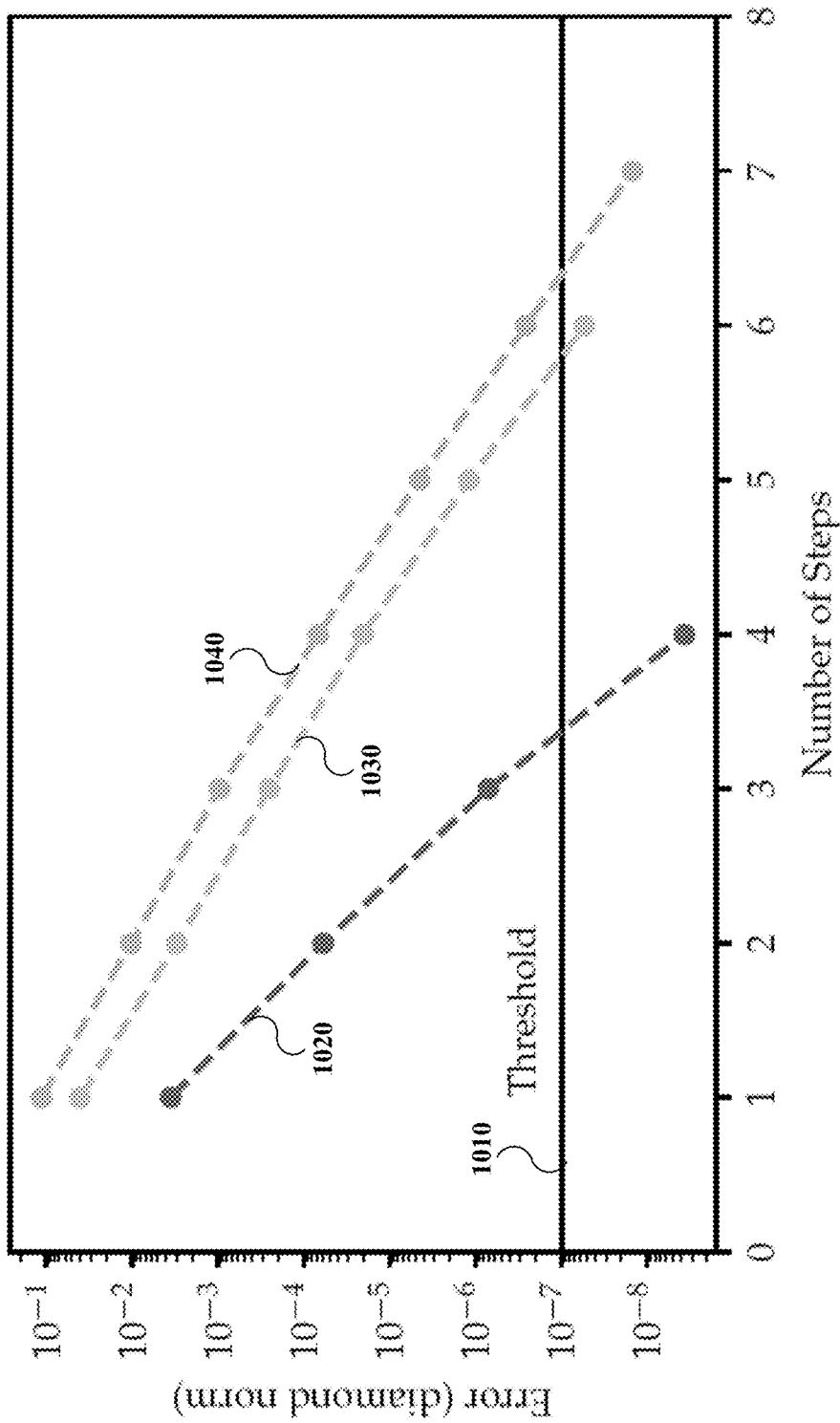
FIG. 10 illustrates an example, non-limiting graph depicting convergence of approximation error via iterations of a Stinespring algorithm, in accordance with one or more embodiments described herein.

FIG. 10 depicts the results of the example demonstration. In particular, FIG. 10 illustrates an example, non-limiting graph 1000 depicting curves showing evolution of approximation error in each step of the Stinespring algorithm. Line 1010 denotes the threshold of $dn_{threshold}=10^{-7}$ that was used to stop the iterative procedure. Curve 1020 corresponds to the Ry gate, curve 1030 corresponds to the CNOT gate, and curve 1040 corresponds to the SWAP gate. FIG. 10 shows how the approximation error decreases for each gate during the Stinespring algorithm. As shown by FIG. 10, the approximation error for each gate converges exponentially quick to zero. This observation is not surprising, and it indicates that every Stinespring iteration reduces the remaining error by a certain relative amount.

For the two qubit gates, each iteration of the Stinespring algorithm extends the decomposition set by 16 operations (because $n_{pos}=n_{neg}=8$). By considering that approximately 6-7 steps are generally involved in reaching a desired threshold, this implies that the produced decomposition basis is significantly smaller than the Endo basis (e.g., around 70-80 elements instead of 256). This result is remarkable and demonstrates that the Stinespring algorithm really does find a basis that is well adapted to the hardware noise. As a reminder, the 256 elements in the Endo basis were needed to span the complete space of Hermitian-preserving operators. The decomposition basis produced by the Stinespring algorithm spans a significantly smaller space, as it is tailored to only represent one specific operation.

Table 5 denotes the C-factors obtained by finding the optimal QPD using the decomposition basis produced by the Stinespring algorithm for the three gates in question. Table 5 shows that C-factors obtained using a decomposition basis produced by the Stinespring algorithm can be substantially lower than those obtained using the Endo basis. As previously discussed, the sampling overhead of the quasiprobability method scales exponentially in the number of gates, where the C-factor forms the basis of that exponential cost. Therefore, any reduction in the C-factor is significant and facilitates the implementation of exponentially larger quantum circuits.

TABLE 5

| | C-factor | |
| --- | --- | --- |
| | Endo basis | Stinespring algorithm |
| Ry | 1.0106 | 1.0056 |
| CNOT | 1.1789 | 1.0812 |
| SWAP | 2.2095 | 1.2323 |

Figure 11:
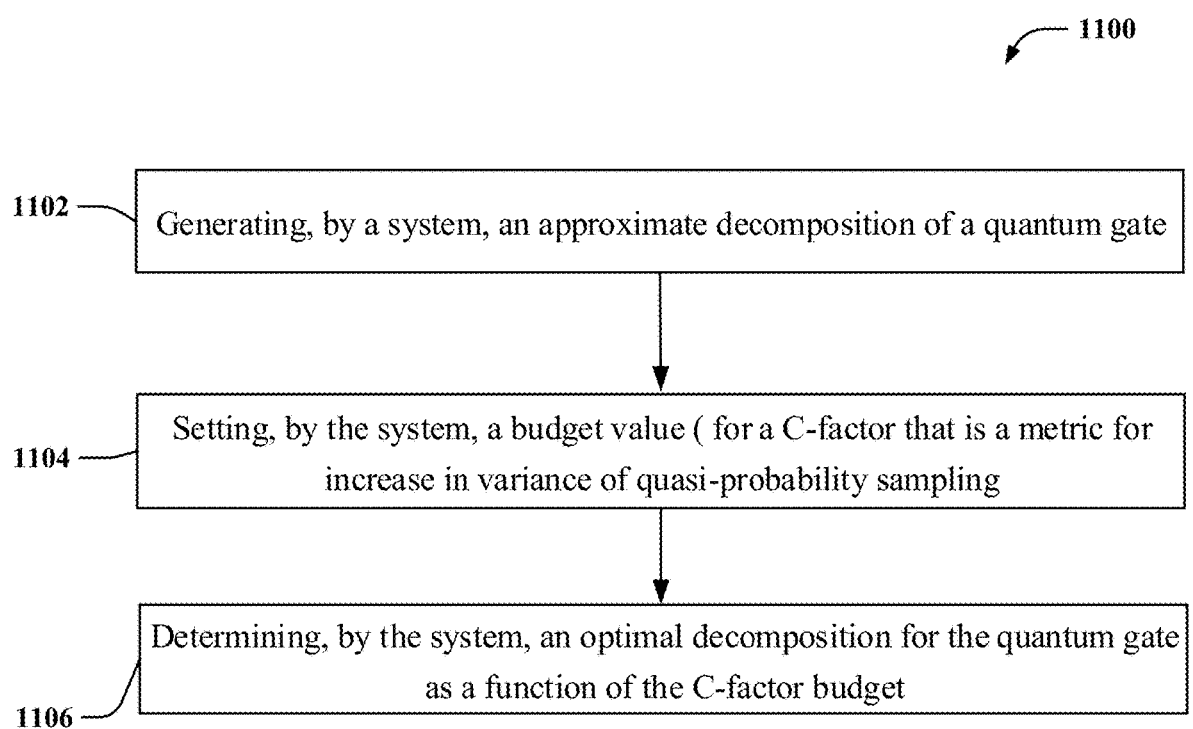
FIG. 11 illustrates a flow diagram of an example, non-limiting computer-implemented method that can facilitate error mitigation for quantum computing devices, in accordance with one or more embodiments described herein.

FIG. 11 illustrates a flow diagram of an example, non-limiting computer-implemented method 1100 of facilitating error mitigation for quantum computing devices, in accordance with one or more embodiments described herein. Repetitive description of like elements employed in other embodiments described herein is omitted for sake of brevity.

At 1102, the computer-implemented method 1100 can comprise generating, by a system (e.g., using approximation component 140), an approximate decomposition of a quantum gate. At 1104, the computer-implemented method 1100 can comprise setting, by the system (e.g., using budget component 150), a budget value ($C_{budget}$) for a C-factor that is a metric for increase in variance of quasi-probability sampling. At 1106, the computer-implemented method 1100 can comprise determining, by the system (e.g., using optimization component 160), an optimal decomposition for the quantum gate as a function of the $C_{budget}$.

In an embodiment, the computer-implemented method 1100 can further comprise generating, by the system, the approximate decomposition utilizing the following equation: $[U] \approx \Sigma_{i=1}^{M} \alpha_i \varepsilon_i$. In this embodiment, U denotes a unitary corresponding to the quantum gate; M denotes decomposition size; $\alpha_i$ denotes quasi-probability coefficients; and $\varepsilon_i$ denotes quantum channels implementable on quantum hardware. In an embodiment, the C-factor=$C(\alpha_1, \ldots, \alpha_M):= \Sigma_{i=1}^{M} |\alpha_i|$. In an embodiment, the computer-implemented method 1100 can further comprise determining, by the system (e.g., using optimization component 160), the optimal decomposition utilizing the following equation: minimize$\|[U]-\Sigma_{i=1}^{M} d_i F_i\|_\diamond$, over $\{d_i\}$. In this embodiment, $d_i$ denotes quasi-probability coefficients and Ti denotes quantum channels implementable on quantum hardware.

In an embodiment, the computer-implemented method 1100 can further comprise minimizing, by the system, $\epsilon(\alpha_1, \ldots, \alpha_M)$ such that $C(\alpha_1, \ldots, \alpha_M) \leq C_{budget}$ where $\epsilon$ denotes error. In an embodiment, the computer-implemented method 1100 can further comprise distributing, by the system (e.g., using distribution component 170), the C-factor across N number of gates where N denotes an integer>1. In an embodiment, the computer-implemented method 1100 can further comprise distributing, by the system (e.g., using distribution component 170), the C-factor across the N gates to reduce a total sum of errors ($\epsilon_1+\epsilon_2+ \ldots +\epsilon_N$). In an embodiment, the computer-implemented method 1100 can further comprise generating, by the system (e.g., using optimization component 160), the optimal decomposition for a trace-preserving (TP) linear map G(ρ) by finding quantum channels $\{\varepsilon_1, \varepsilon_2, \varepsilon_3, \ldots, \varepsilon_M\}$ and corresponding coefficients $\{\alpha_1, \alpha_2, \alpha_3, \ldots, \alpha_M\}$ such that: $G(\rho)=\Sigma_{i=1}^{M} \alpha_i \varepsilon_i$ and $\Sigma_{i=1}^{M} |\alpha_i|$ is minimal. In an embodiment, the computer-implemented method 1100 can further comprise setting, by the system (e.g., using optimization component 160), a rank constraint to <=2. In an embodiment, the rank constraint corresponds to dimensionality of ancilla Hilbert space, and $\varepsilon_i$ comprises ceiling(log_2(r)) ancilla qubits.

In an embodiment, the computer-implemented method can further comprise determining, by the system, an optimal decomposition utilizing an iterative algorithm that includes decomposing an error that is indicative of a total approximation error between a set of desired quantum channels and a set of approximation quantum channels. In an embodiment, the set of approximation quantum channels can be generated using a Stinespring dilation. In an embodiment, the computer-implemented method can further comprise using, by the system, variational unitary approximation to implement the Stinespring dilation. In an embodiment, the computer-implemented method can further comprise determining, by the system, an optimal variational unitary approximation utilizing the following equation: minimize$\|V_{St}-V(U_{Var}(\theta))\|_2$. In an embodiment, θ denotes a tuple of a variational parameters; $V_{St}$ denotes a Stinespring isometry; $U_{Var}(\theta)$ denotes a unitary operation associated with the quantum gate as represented by a variational form; and $V(U_{Var}(\theta))$ denotes a submatrix of $U_{Var}(\theta)$ restricted on a subspace where ancilla qubits are fixed to a zero state.

Figure 12:
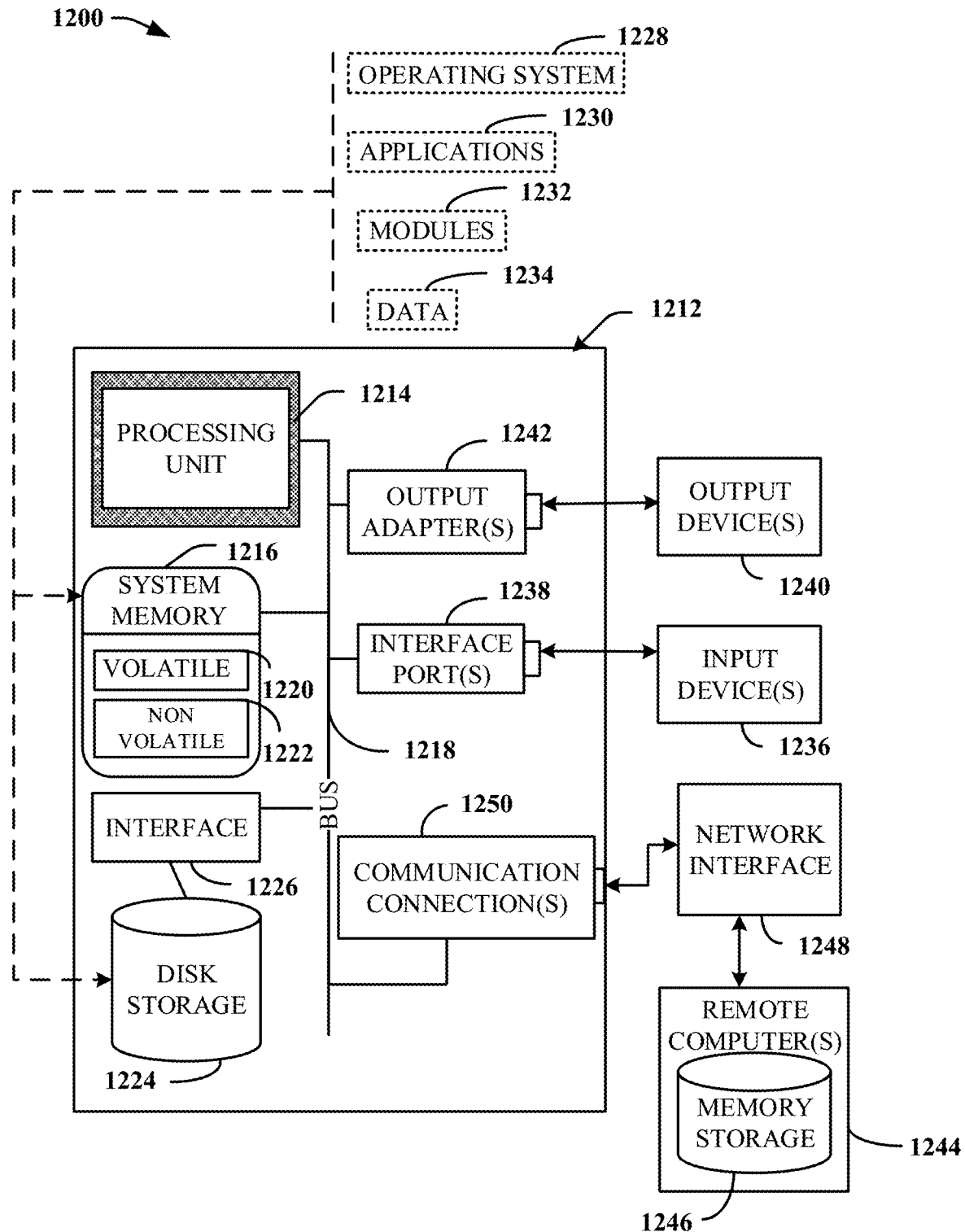
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1200. Such software can also include, for example, an operating system 1228. Operating system 1228, which can be stored on disk storage 1224, acts to control and allocate resources of the computer 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It can be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor-based appliance, a peer device or other common network node and the like, and typically can also include many or the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a quantum processor;
a memory that stores computer executable components; and
a classical processor that executes the computer executable instructions stored in the memory to perform operations comprising:
optimizing probabilistic error mitigation on the quantum processor, wherein the optimizing comprises:
generating an approximate decomposition of a quantum gate into a weighted combination of hardware-implementable quantum channels using quasi-probability coefficients;
determining a total sampling overhead constraint for the quantum circuit based on the decomposition;
distributing a total sampling budget across a plurality of gates in the circuit to minimize cumulative variance introduced by probabilistic sampling;
selecting an optimal set of quantum channels and associated coefficients that approximate a trace-preserving linear transformation of a quantum state, such that the approximation minimizes deviation from an ideal behavior while constraining the magnitude of the coefficients;
generating a unitary realization of the selected quantum channel combination using Stinespring dilation, wherein the realization is optimized via variational approximation subject to a rank constraint based on available ancilla qubit resources; and
controlling the execution of the decomposed and optimized quantum operations on the quantum processor, such that quantum sampling overhead is reduced and circuit fidelity is improved on noisy intermediate-scale quantum hardware.

2. The system of claim 1, wherein the classical processor distributes the sampling budget across the gates based on an estimate of the error contribution of each gate to the total circuit error, such that gates with higher expected variance receive greater allocation from the total sampling budget.

3. A computer-implemented method for optimizing probabilistic error mitigation on a quantum processor, comprising:
generating an approximate decomposition of a quantum gate into a weighted combination of hardware-implementable quantum channels using quasi-probability coefficients;
allocating the total sampling budget across a plurality of gates in the quantum circuit to minimize cumulative variance introduced by probabilistic sampling;
selecting, from a plurality of stored decomposition templates, a decomposition that satisfies the sampling constraint and is adapted to hardware-specific fidelity characteristics of the quantum processor;
optimizing the selected decomposition to approximate a trace-preserving transformation that minimizes deviation from a target gate behavior while satisfying ancilla qubit availability constraints; and
executing the optimized transformation on the quantum processor to reduce quantum sampling overhead while improving effective circuit fidelity on noisy intermediate-scale quantum hardware.

4. The computer-implemented method of claim 3, wherein the selecting the decomposition comprises initiating an iterative optimization process that evaluates a plurality of candidate approximations based on deviation from an ideal gate behavior and compatibility with ancilla qubit constraints of the quantum processor.

5. The computer-implemented method of claim 3, wherein the optimizing the decomposition comprises generating a unitary implementation of a noisy quantum channel using Stinespring dilation, wherein the unitary implementation operates over a larger Hilbert space including ancilla qubits and is executable on the quantum processor.

6. A computer program product for optimizing probabilistic error mitigation on a quantum processor, comprising a computer readable storage medium having program instructions embodied therewith, the program instructions executable by a processor to cause the processor to perform operations comprising:
generating an approximate decomposition of a quantum gate into a weighted combination of quantum channels that are physically implementable on the quantum processor, wherein the channels are associated with quasi-probability coefficients;
determining a total sampling overhead constraint for a quantum circuit based on the decomposition;
distributing the total sampling budget across a plurality of quantum gates to minimize cumulative sampling variance throughout the circuit;
selecting a decomposition that approximates an ideal gate behavior while satisfying ancilla qubit availability constraints of the quantum processor;
generating a unitary implementation of the selected decomposition using Stinespring dilation, wherein the implementation operates over an extended Hilbert space that includes ancilla qubits and is optimized using a variational approximation process; and
causing execution of the resulting unitary implementation on the quantum processor to reduce total quantum sampling overhead and improve circuit fidelity under noise conditions present in near-term quantum hardware.

* * * * *